(12) United States Patent
Belleschi et al.

(10) Patent No.: US 11,711,807 B2
(45) Date of Patent: Jul. 25, 2023

(54) MULTI-LEVEL INDICATOR OF RADIO RESOURCE STATUS FOR INTENDED D2D TRANSMISSION

(71) Applicant: Telefonaktiebolaget LM Ericsson (publ), Stockholm (SE)

(72) Inventors: Marco Belleschi, Solna (SE); Shehzad Ali Ashraf, Aachen (DE); Ricardo Blasco Serrano, Espoo (FI); Gabor Fodor, Hässelby (SE); Wanlu Sun, Solna (SE); Chunhui Zhang, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 664 days.

(21) Appl. No.: 16/088,669

(22) PCT Filed: Jul. 9, 2018

(86) PCT No.: PCT/EP2018/068562
§ 371 (c)(1),
(2) Date: Sep. 26, 2018

(87) PCT Pub. No.: WO2020/011336
PCT Pub. Date: Jan. 16, 2020

(65) Prior Publication Data
US 2021/0219320 A1  Jul. 15, 2021

(51) Int. Cl.
*H04W 72/12* (2023.01)
*H04W 92/18* (2009.01)
(Continued)

(52) U.S. Cl.
CPC ............ *H04W 72/20* (2023.01); *H04W 92/18* (2013.01)

(58) Field of Classification Search
CPC . H04W 92/18; H04W 76/14; H04W 72/0453; H04W 52/322; H04W 36/30;
(Continued)

(56) References Cited

U.S. PATENT DOCUMENTS

2012/0213116 A1* 8/2012 Koo ...................... H04W 88/06
370/253
2015/0327201 A1  11/2015 He et al.
(Continued)

FOREIGN PATENT DOCUMENTS

WO    WO 2016/163972 A1    10/2016

OTHER PUBLICATIONS

International Search Report, PCT/SE2018/051370, dated Feb. 28, 2019, 5 pages.
J Schlienz et al., Device to Device Communication in LTE Whitepaper D2D Communication, Sep. 29, 2015, XP55409063, 36 Pages.
3GPP TS 23.303 V14.1.0 (Dec. 2016), 3rd Generation Partnership Project; Technical; Specification Group Services and System Aspects; Proximity-based services (ProSe); Stage 2 (Release 14), 124 Pages.
(Continued)

*Primary Examiner* — Khaled M Kassim
*Assistant Examiner* — Jason A Harley
(74) *Attorney, Agent, or Firm* — Sage Patent Group

(57) ABSTRACT

A radio device receives a first message from a further radio device. The first message indicates an intention of the further radio device to perform a device-to-device radio transmission on a set of radio resources. The radio device determines a status of the set of radio resources. In response to the first message, the radio device sends a second message comprising an indicator which indicates the determined status of the set of radio resources in terms of at least three levels.

22 Claims, 8 Drawing Sheets

(51) Int. Cl.
  *H04W 72/04* (2023.01)
  *G06Q 10/06* (2023.01)
  *H04W 72/02* (2009.01)
  *H04L 5/00* (2006.01)
  *H04W 72/20* (2023.01)

(58) Field of Classification Search
  CPC . H04W 52/367; H04W 52/383; H04W 64/00; H04W 4/46; H04W 74/04; H04L 67/325; H04L 43/16
  USPC .......................................... 709/219; 455/522
  See application file for complete search history.

(56) References Cited

U.S. PATENT DOCUMENTS

| | | | |
|---|---|---|---|
| 2016/0234754 A1* | 8/2016 | Baghel | H04W 72/1284 |
| 2016/0242152 A1 | 8/2016 | Yu et al. | |
| 2017/0071019 A1* | 3/2017 | Wakabayashi | H04W 72/02 |
| 2017/0195998 A1 | 7/2017 | Zhang et al. | |
| 2017/0257822 A1* | 9/2017 | Harris | H04W 48/18 |
| 2018/0092065 A1 | 3/2018 | Sheng | |
| 2019/0116586 A1* | 4/2019 | Basu Mallick | H04W 72/51 |

OTHER PUBLICATIONS

3GPP TS 23.401 V14.6.0 (Dec. 2017), 3rd Generation Partnership Project; Technical Specification Group Services and System Aspects; General Packet Radio Service (GPRS) enhancements for Evolved Universal Terrestrial Radio Access Network (E-UTRAN) access (Release 14), 393 Pages.

3GPP TS 36.201 V14.1.0 (Mar. 2017), 3rd Generation Partnership Project; Technical Specification Group Radio Access Network; Evolved Universal Terrestrial Radio Access (E-UTRA); LTE physical layer; General description (Release 14), 15 Pages.

3GPP TS 36.213 V15.0.0 (Dec. 2017), 3rd Generation Partnership Project; Technical Specification Group Radio Access Network; Evolved Universal Terrestrial Radio Access (E-UTRA); Physical layer procedures (Release 15), 7 Pages.

Intel Corporation, on Sensing Design Details for Sidelink V2V Communication, 3GPP TSG RAN WG1 Meeting #84bis, Busan, Korea Apr. 11-15, 2016, R1-162363, 10 Pages.

Third Examination Report for Australian Patent Application No. 2018431394, dated Mar. 8, 2022, 5 pages.

* cited by examiner

MULTI-LEVEL INDICATOR OF RADIO RESOURCE STATUS FOR INTENDED D2D TRANSMISSION

CROSS REFERENCE TO RELATED APPLICATIONS

This application is a 35 U.S.C. § 371 national stage application of PCT International Application No. PCT/EP2018/068562 filed on Jul. 9, 2018, the disclosure and content of which is incorporated by reference herein in its entirety.

TECHNICAL FIELD

The present invention relates to methods for controlling radio transmissions and to corresponding radio devices, systems, and computer programs.

BACKGROUND

In a wireless communication network a transmission direction from the wireless communication network to a UE (user equipment) is typically referred to as "downlink" (DL) direction, while a transmission direction from the UE to the wireless communication network is typically referred to as "uplink" (UL) direction. In addition to DL radio transmissions and UL radio transmissions, it is known to support direct radio transmissions between UEs. These direct radio transmissions may be referred to as device-to-device (D2D) or "sidelink" (SL) radio transmissions. For example, in the case of the LTE (Long Term Evolution) radio technology specified by 3GPP (3$^{rd}$ Generation Partnership Project), SL radio transmissions are defined in 3GPP TS 36.201 V14.1.0 (2017-03). The SL radio transmissions may for example be used for V2X (vehicle-to-anything) communications, which may for example include: V2V (vehicle-to-vehicle) communications between vehicles; V2P (vehicle-to-pedestrian) communications between a vehicle and a device carried by an individual, e.g., a handheld terminal carried by a pedestrian, cyclist, driver, or passenger; V2I (vehicle-to-infrastructure) communications between a vehicle and a roadside unit (RSU) of traffic infrastructure, e.g., an entity transmitting speed limit notifications, and V2N (vehicle-to-network) communications between a vehicle and a node of the wireless communication network. As a general rule, V2X communications may utilize network infrastructure when available. However, at least basic V2X communication functionalities should also be possible without network infrastructure, e.g., outside network coverage. D2D or sidelink transmissions are also supported by the 5$^{th}$ Generation (5G) NR (New Radio) technology which is currently being developed by 3GPP.

In 3GPP TS 36.213 V15.0.0 specifies a mode of operation for SL radio transmissions, referred to as "mode 4". In mode 4, the UE selects the radio resources to be used for a SL radio transmission from a large set of radio resources configured by the network or preconfigured in the UE. The resource allocation in mode 4 makes combined use of two features: semi-persistent and sensing-based resource allocation. The semi-persistent allocation aspect utilizes the fact that typical safety V2X traffic is more or less periodic, which means that data to be transmitted is typically are generated at regular intervals. This regular character of data transmissions allows a transmitting UE to notify other UEs about its intention to use certain radio resources for future transmissions, by making a reservation or booking of such time-frequency resources. The sensing-based allocation aspect involves monitoring the set of radio resources to learn about the presence of semi-persistent transmissions by other UEs. In this way, the transmitting UE can select the radio resources for its own SL radio transmissions in such a way that collisions with SL radio transmissions by other UEs are avoided.

In mode 4 each UE selects resources for its own SL radio transmission based on locally available information, e.g., sensing measurements and reservations indicated by other UEs. This may result in a "hidden node problem" or a "exposed node problem". The hidden node problem refers to a case when a first UE which intends to perform an SL radio transmission is unable or failed to sense the usage or booking of resources by another UE (the hidden node), and selects the same resource for its own SL radio transmission. This may result in a collision of the SL radio transmissions by the UEs at another UE which is in the transmission range of both transmitting UEs. The exposed node problem refers to a case when one UE which intends to perform an SL radio transmission (the exposed node) senses an ongoing SL radio transmission by another nearby UE, resulting in the UE refraining from performing the SL radio transmission, even if the intended SL radio transmission would have be successfully received at the intended receiver UE, because the intended receiver UE is outside the transmission range of the other transmitting UE. These problems become even more relevant when using unicast modes or multicast transmission modes and/or directional transmission modes like beamforming, as for example considered for D2D transmission in the NR technology.

Accordingly, there is a need for techniques which allow for efficiently allocating radio resources for D2D radio communications.

SUMMARY

According to an embodiment, a method of controlling D2D radio transmissions in a wireless communication network is provided. According to the method, a radio device receives a first message from a further radio device. The first message indicates an intention of the further radio device to perform a D2D radio transmission on a set of radio resources. Further, the radio device determines a status of the set of radio resources. In response to the first message, the radio device sends a second message comprising an indicator which indicates the determined status of the set of radio resources in terms of at least three levels.

According to a further embodiment, a method of controlling D2D radio transmissions in a wireless communication network is provided. According to the method, a radio device sends a first message to a further radio device. The first message indicates an intention of the radio device to perform a D2D radio transmission on a set of radio resources. In response to the first message, the radio device receives a second message comprising an indicator which indicates a status of the set of radio resources as determined by the further radio device in terms of at least three levels. Depending on the indicator, the radio device controls the D2D radio transmission by the radio device.

According to a further embodiment, a radio device for a wireless communication network is provided. The radio device is configured to receive a first message from a further radio device. The first message indicates an intention of the further radio device to perform a D2D radio transmission on a set of radio resources. Further, the radio device is configured to determine a status of the set of radio resources.

Further, the radio device is configured to send, in response to the first message, a second message comprising an indicator which indicates the determined status of the set of radio resources in terms of at least three levels.

According to a further embodiment, a radio device for a wireless communication network is provided. The radio device comprises at least one processor and a memory containing instructions executable by said at least one processor, whereby the radio device is operative to: receive a first message from a further radio device, the first message indicating an intention of the further radio device to perform a D2D radio transmission on a set of radio resources; determine a status of the set of radio resources; and in response to the first message, send a second message comprising an indicator which indicates the determined status of the set of radio resources in terms of at least three levels.

According to a further embodiment, a radio device for a wireless communication network is provided. The radio device is configured to send a first message to a further radio device. The first message indicates an intention of the radio device to perform a D2D radio transmission on a set of radio resources. Further, the radio device is configured to receive, in response to the first message, a second message comprising an indicator which indicates a status of the set of radio resources as determined by the further radio device in terms of at least three levels. Further, the radio device is configured to control the D2D radio transmission by the radio device depending on the indicator.

According to a further embodiment, a radio device for a wireless communication network is provided. The radio device comprises at least one processor and a memory containing instructions executable by said at least one processor, whereby the radio device is operative to: send a first message to a further radio device, the first message indicating an intention of the radio device to perform a D2D radio transmission on a set of radio resources; in response to the first message, receive a second message comprising an indicator which indicates a status of the set of radio resources as determined by the further radio device in terms of at least three levels; and control the D2D radio transmission by the radio device depending on the indicator.

According to a further embodiment, a system is provided. The system comprises a first radio device and a second radio device. The first radio device is configured to: send a first message to the radio device, the first message indicating an intention of the first radio device to perform a D2D radio transmission on a set of radio resources; in response to the first message, receive a second message comprising an indicator which indicates a status of the set of radio resources as determined by the second radio device in terms of at least three levels; and control the D2D radio transmission by the radio device depending on the indicator. The second radio device is configured to: receive the first message from the first radio device; determine the status of the set of radio resources; and in response to the first message, send the second message comprising the indicator which indicates the determined status of the set of radio resources.

According to a further embodiment of the invention, a computer program or computer program product is provided, e.g., in the form of a non-transitory storage medium, which comprises program code to be executed by at least one processor of a radio device for a wireless communication network. Execution of the program code causes the radio device to: receive a first message from a further radio device, the first message indicating an intention of the further radio device to perform a D2D radio transmission on a set of radio resources; determine a status of the set of radio resources; and in response to the first message, send a second message comprising an indicator which indicates the determined status of the set of radio resources in terms of at least three levels.

According to a further embodiment of the invention, a computer program or computer program product is provided, e.g., in the form of a non-transitory storage medium, which comprises program code to be executed by at least one processor of a radio device for a wireless communication network. Execution of the program code causes the radio device to; send a first message to a further radio device, the first message indicating an intention of the radio device to perform a D2D radio transmission on a set of radio resources; in response to the first message, receive a second message comprising an indicator which indicates a status of the set of radio resources as determined by the further radio device in terms of at least three levels; and control the D2D radio transmission by the radio device depending on the indicator.

Details of such embodiments and further embodiments will be apparent from the following detailed description of embodiments.

DETAILED DESCRIPTION OF EMBODIMENTS

Figure 1:
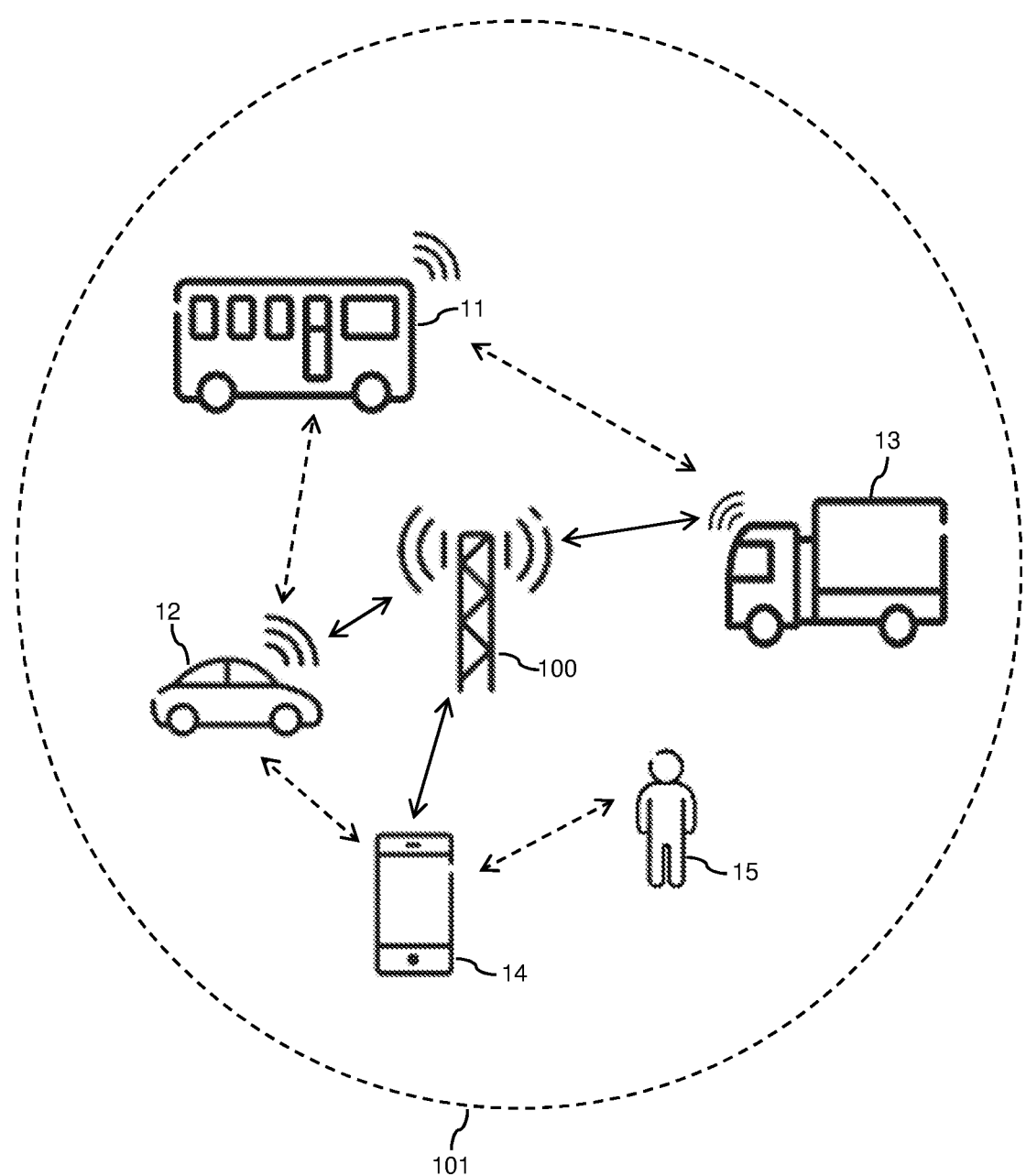
FIG. 1 shows an exemplary scenario for illustrating radio transmissions in a wireless communication network according to an embodiment of the invention.

In the following, concepts in accordance with exemplary embodiments of the invention will be explained in more detail and with reference to the accompanying drawings. The illustrated embodiments relate to controlling of D2D radio transmissions in a wireless communication network. In the illustrated examples, it is assumed that the wireless communication network is assumed to be based on the LTE radio technology. In this case, the D2D radio transmissions may be based on the SL transmission mode of the LTE radio technology. However, it is noted that other radio technologies supporting D2D radio transmissions could be used as well, e.g., a 5G radio technology like the NR technology currently developed by 3GPP.

In the illustrated concepts, resource selection for D2D radio transmissions between radio devices are assisted by messages exchanged by the radio devices. In particular, a radio device which intends to perform a D2D radio transmission on a set of radio resources, in the following also referred to as transmitting radio device, sends a message indicating the intention to perform the D2D radio transmission on the set of radio resources. The transmitting radio device may select the set of resources on the basis of measurements performed by the transmitting radio device and/or on the basis of other information which is locally available at the transmitting radio device. The set of radio resources may consist of one or more resources separated in the frequency domain, e.g., as frequency channels, in the time domain, e.g., as time slots, or in both the time and frequency domain, e.g., as resource elements of a time-frequency grid. The set of resources may also be defined in terms of groups of such resources, such as PRBs (physical resource blocks).

The message from the transmitting radio device may be received by one or more further radio devices. Such further radio device then determines the status of the set of radio resources and sends a feedback message to the radio device which intends to perform the D2D radio transmission. The further radio device may determine the status on the basis of measurements performed by the further radio device and/or on the basis of other information which is locally available at the further radio device. In this way, the further radio device can assess the status of the set of radio resources in a precise manner. The feedback message includes a multi-level (ML) indicator, which indicates the status of the set of radio resources in terms of at least three levels. Such levels may for example represent different signal strengths, e.g., in terms of reference signal received power (RSRP) or received signal strength indicator (RSSI), as measured by the further radio device on the set of radio resources.

By using the additional information provided by the ML indicator in the feedback message, the transmitting radio device can accurately decide on the utilization of the set of radio resources and efficiently avoid collisions by the D2D radio transmission on the set of radio resources. For example, if the ML indicator received in the feedback message indicates a that the further radio device measured a high signal strength level on the set of radio resources, this may be indicative of a hidden node which cannot be sensed by the transmitting radio device. By refraining from performing the D2D radio transmission on the set of radio resources, the transmitting radio device can thus avoid a collision due to the hidden node. Accordingly, the ML indicator in the feedback message may help to address hidden node problems. In another example, the ML indicator received in the feedback message may indicate a that the further radio device measure a low signal strength level on the set of radio resources, while though the signal strength level measured by the transmitting radio device itself on the set of radio is higher, this may be indicative of an exposed node which might not affect the intended receiver of the D2D transmission. By performing the D2D radio transmission on the set of radio resources, the transmitting radio device can thus efficiently utilize the set of radio resources. Accordingly, the ML indicator in the feedback message may also help to address exposed node problems.

FIG. 1 illustrates an exemplary scenario involving D2D radio transmissions. More specifically, FIG. 1 shows an access node 100 of the wireless communication network, in the LTE radio technology referred to as eNB, and various entities 11, 12, 13, 14, 15 which may communicate by using DL radio transmissions and/or UL radio transmissions, illustrated by solid arrows, and D2D radio transmissions, illustrated by broken arrows. A service area, or cell, of the access node is schematically illustrated by 101. The service area 101 may be defined by a radio coverage area in which DL radio transmissions from the access node 100 and UL radio transmissions to the access node 100 are possible. Here, it is noted that the wireless communication network may comprise further access nodes, each having a corresponding service area which may be overlapping or non-overlapping with the coverage area 101 of the access node 100.

The entities illustrated in FIG. 1 comprise vehicles 11, 12, 13, a mobile phone 14, and a person 15, e.g., a pedestrian, a cyclist, a driver of a vehicle, or a passenger of a vehicle. Here, it is noted that in the case of the vehicles 11, 12, 13 the radio transmissions may be performed by a communication module installed in the vehicle, and that in the case of the person 15 the radio transmissions may be performed by a radio device carried or worn by the person 15, e.g., a wristband device or similar wearable device. Those devices and modules may be also referred as UEs. The D2D radio transmissions may be enabled by the DL radio transmissions and/or UL radio transmissions, e.g., by using DL radio transmissions from the access node 100 to control or otherwise manage the D2D radio transmissions. As further explained below this may involve providing the above-mentioned assistance information to the radio devices and/or modules of the entities. Furthermore, it is noted that the entities shown in FIG. 1 are merely exemplary. The D2D radio transmissions may be used for implementing various kinds of V2X communication, including V2V communication, V2P communication and/or V2I communication. Accordingly, the SL radio transmissions may carry various types of V2X messages, e.g., a cooperative awareness message (CAM) or a decentralized environmental notification message (DENM). However, other kinds of D2D radio communication could be supported as well.

In V2V communication, the transmitting UE is mounted on a vehicle. For this reason, it is sometimes referred to as vehicle UE (V-UE). V2P communication involves V-UEs as well as pedestrian UEs (P-UEs). These are usually handheld devices, e.g., like a mobile phone or smartphone, or wearable devices, e.g., like a smart watch or activity tracker. P-UEs and V-UEs typically have different sets of requirements and constraints. For example, P-UEs are typically subject to energy constraints, whereas V-UEs are connected to the vehicle engine and thus typically have no significant energy constraints. This implies that V-UEs and P-UEs have different capabilities to handle V2X communications, where V-UEs may be considered as more advanced UEs while P-UEs are usually considered as UEs with limited capabilities. In other words, a P-UE typically is more limited with respect to its capabilities than a V-UE: Moreover, P-UEs may also be classified into different capability categories, i.e., P-UEs with D2D receiver capabilities and P-UEs without D2D receiver capabilities.

In accordance with assumed utilization of the LTE radio technology, the D2D radio transmissions may be based on the PC5 interface as specified 3GPP TS 23.303 V14.1.0 (2016-12). The DL radio transmissions and the UL radio transmissions may be based on the LTE Uu interface as specified in 3GPP TS 23.401 V14.6.0 (2017-12). The D2D radio transmissions may involve a data transmission on a PSSCH (Physical Sidelink Shared Channel) and a transmission of SCI (Sidelink Control Information) on a PSCCH (Physical Sidelink Control Channel). The SCI may for example be used to indicate the subset of radio resources which was selected to be used for the D2D radio transmission.

In the illustrated examples, the allocation of radio resources for a D2D transmission is performed in a distributed or autonomous manner, using a sensing-based resource selection scheme similar to the "mode 4" operation defined in 3GPP TS 36.213 V15.0.0. Specifically, the sending radio device performs channel sensing and uses the results of channel sensing to autonomously determines which radio resources from a resource pool to use for its D2D radio transmissions. The channel sensing is used to estimate which radio resources are used by other radio devices. The channel sensing is supplemented by information gathered from messages exchanged between UEs acting as a transmitter or transmitter of D2D radio transmissions. This message exchange may be used for making information on the status of radio resources sensed by a certain UE also available to other UEs.

The sensing-based resource selection scheme may involve the following steps: In a first step, the UE which intends to perform a D2D transmission assumes all resources of the resource pool as being available. In a second step, the UE excludes some of these resources based on received scheduling assignments (SAs) or other conditions. Here, a resource may be excluded if it is indicated or reserved by a decoded SA and PSSCH RSRP in the associated data resources is above a threshold. In step 3, the UE measures and ranks the remaining PSSCH resources based on RSSI measurements and selects a subset of resources from the resource pool. The selected subset may be a set of candidate resources with the lowest total RSSI. The size of the subset may correspond to about 20% of the total resources in the resource pool.

The above-mentioned channel sensing may involve that the UE senses the channel for some time duration, e.g., a sensing time window, preceding the (re)selection trigger to gather booking messages. In order to achieve good performance the sensing time window should be long enough to detect as many bookings as possible or necessary. Commonly, the size of the sensing time window is sufficiently large to roughly cover the longest possible booking, which is considered as full-sensing procedure. However, with long sensing time windows, there is a large energy consumption associated with sensing. In addition, large sensing time windows may require the UE to perform complex operations quickly. This may be problematic for some types of UEs that are subject to restrictions on capabilities and/or energy, e.g., P-UEs. To address this problem for UEs with limited capabilities, a partial-sensing procedure and/or a random resource selection procedure may be used. In the partial-sensing procedure, the UE senses only a subset of the resources within the sensing time window. In the random resource selection procedure, the UE selects the resources in a random manner without using any sensing process.

Figure 2:
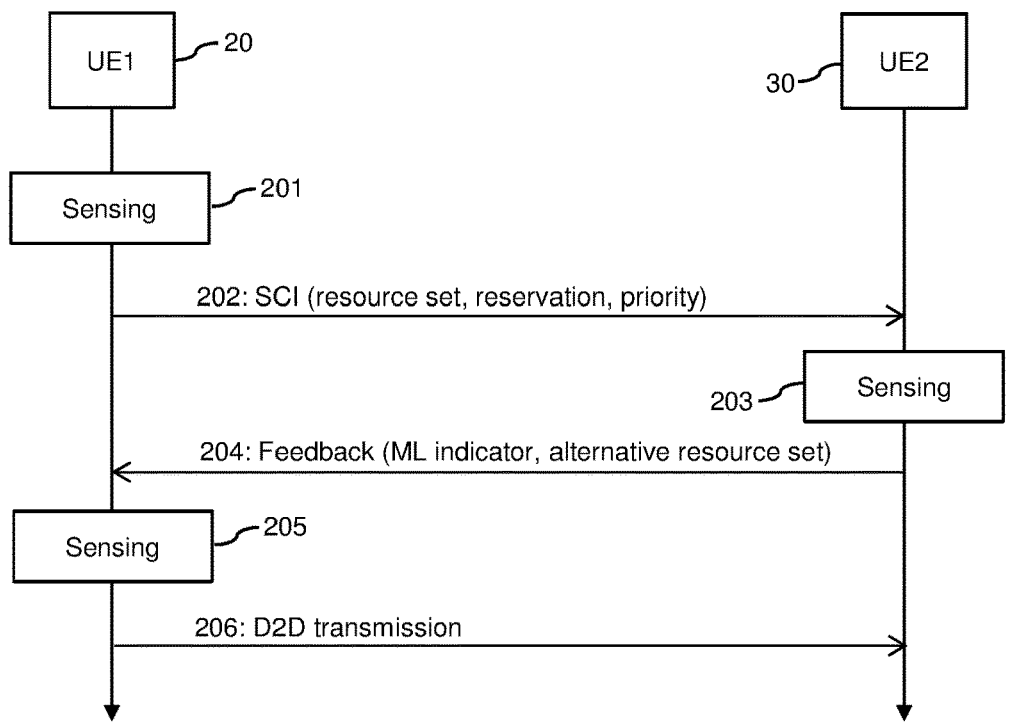
FIG. 2 illustrates an example of processes in which a D2D radio transmission is controlled according to an embodiment of the invention.

FIG. 2 shows an example of processes in which a D2D radio transmission is controlled based on the principles as outlined above. The processes of FIG. 2 involve a first UE 20 (UE1) and a second UE 30 (UE2). With respect to the concepts as outlined above, the first UE 20 acts as the transmitting radio device. The second UE 30 acts as the receiving radio device. Here, it is noted that the UEs 20, 30 could correspond to any of the entities 11, 12, 13, 14, 15 as illustrated in FIG. 1.

In the example of FIG. 2, the first UE 20 senses the resource pool to select a candidate set of radio resources to be used for a D2D radio transmission by the first UE 20, as illustrated by block 201. The sensing of block 201 may be performed as described above. That is to say, the first UE 20 may initially assume all resources of the resource pool are available and then successively exclude resources which are found to be booked or reserved by another UE, e.g., based on SAs received from the other UEs. Further, the first UE 20 may exclude resources for which the UE measures a received signal strength, e.g., in terms of RSRP or RSSI, is above a threshold. From the remaining resources, the first UE 20 may then select the candidate set of resources, e.g., by selecting the set of candidate resources with the lowest total RSSI.

The first UE 20 then sends SCI 202 to the second UE 30. The SCI 202 may be transmitted in a broadcast mode, so that the SCI 202 is receivable not only by the second UE 30, but also by other UEs located in a transmission range of the first UE 20. However, it is also possible that the SCI 202 is transmitted in a unicast mode, i.e., addressed only to the second UE 20, or in a multicast mode, i.e., addressed to a group of UEs which includes the second UE 30.

The SCI 202 indicates to one or more other UEs, in particular to the second UE 30, that the first UE 20 intends to perform a D2D radio transmission on the candidate set of radio resources. In the illustrated example, the SCI 202 carries a SA for the intended D2D radio transmission. Accordingly, the SCI 202 includes an indication of the candidate set of resources. The SCI 202 may also include a reservation of the candidate set of resources for multiple future time slots, e.g., in order to address a need to periodically or otherwise repeatedly transmit data to the second UE 30. Still further, the SCI 202 may indicate a priority of the intended D2D radio transmission. For example, such priority could be indicated by a PPPP (Prose Per-Packet Security) in the SCI 202. As for example specified in 3GPP TS 23.303 V14.1.0, the PPPP is set on an application layer for each message transmitted over the PC5 interface.

As further illustrated, the second UE 30 receives the SCI 202, Similar to the first UE 20, also the second UE 30 performs sensing of the resource pool, as illustrated by block 203. At least a part of the sensing may be performed in response to receiving the SCI 202. The second UE 30 uses the results of sensing to determine an availability status of the candidate set of radio resources from the perspective of the second UE 30. Further, in response to detecting, based on the received SCI 202, the first UE's 20 intention to perform the D2D radio transmission on the candidate set of resources based the second UE 30 sends a feedback message 204 to the first UE 20. The feedback message 204 indicates the availability status of the candidate set of resources as determined by the second UE 30. The feedback message 204 can be conveyed on a control channel, e.g., in SCI transmitted by the second UE 30, or on a data channel, e.g., as part of a D2D radio transmission performed by the second UE 30. The feedback message 204 may be transmitted in a broadcast mode, so that the feedback message 204 is receivable not only by the first UE 20, but also by other UEs located in a transmission range of the second UE 30. However, it is also possible that the feedback message 204 is transmitted in a unicast mode, i.e., addressed only to the first UE 20, or in a multicast mode, i.e., addressed to a group of UEs which includes the first UE 20.

The feedback message 204 includes an ML indicator to indicate the availability status of the candidate set of radio resources. As mentioned above, the ML indicator indicates the availability status in terms of at least three different levels. These multiple levels may for example correspond to different levels of measured interfering signal strength on the candidate set of resources, e.g., in terms of RSRP or RSSI, or to different congestion levels of the candidate set of resources. For example, the ML indicator could indicate the availability status in terms of four different levels by using two bits. For example, if the interfering signal strength on the candidate set of resources measured by the second UE 30 is denoted by Y, three threshold levels H1, H2 and H3 could be configured, and the ML indicator be set to the first level (e.g., encoded by "11") if Y≤H1, to the second level (e.g., encoded by "10") if H1<Y≤H2, to the third level (e.g., encoded by "01") if H2<Y≤H3; and to the fourth level (e.g., encoded by "00") if Y>H3. The first level may be defined to indicate a positive acknowledgement, i.e., that the second UE 30 approves the D2D radio transmission on the candidate set of radio resources. Similarly, the fourth level could be defined to indicate a negative acknowledgement, i.e., that the second UE 30 disapproves the D2D radio transmission on the candidate set of radio resources, e.g., because second UE 30 considers the candidate set of resources to be at least partially occupied.

The second UE 30 may also base the setting of the ML indicator in the feedback message 204 on further criteria. For example, the second UE 30 could set the ML indicator depending on a capability of the second UE 30. In this way, the setting of the ML indicator may for example also take into account whether the second UE 30 would be capable of successfully receiving and decoding the intended D2D radio transmission of the candidate set of radio resources. For example, for a certain level of measured interfering signal strength or a certain level of congestion, the second UE 30 could set the ML to the first level if it has advanced receiver and can thus be expected to successfully receive and decode the intended D2D radio transmission at this level of measured interfering signal strength or level of congestion. On the other hand, if the second UE 30 has a simple receiver and thus is expected to not be able to successfully receive and decode the intended D2D radio transmission at this level of measured interfering signal strength or level of congestion, the second UE 30 could set the ML indicator to the fourth level to indicate a negative acknowledgement and thereby cause the first UE 20 to refrain from performing the intended D2D radio transmission on the candidate set of radio resources. Here, an advanced receiver could for example be a receiver with sufficient processing capabilities to perform MMSE-IRC (Minimum Mean Squared Error Interference Rejection), SIC (self-interference cancellation), or the like.

As a further example, the second UE 30 could set the ML indicator depending on capabilities like a number of receiver processing chains of the second UE 30, half duplex limitations of the second UE 30, or the like. For example, if the second UE 30 intends to transmit on time resources which overlap with the candidate set of resources and cannot receive the intended D2D transmission due to half duplex limitations, the second UE 30 may set the ML indicator to the fourth level to indicate a negative acknowledgement and thereby cause the first UE 20 to refrain from performing the intended D2D radio transmission on the candidate set of radio resources. Similarly, if no receiver chains of the second UE 30 would be available for receiving the intended D2D transmission, the second UE 30 may set the ML indicator to the fourth level to indicate a negative acknowledgement and thereby cause the first UE 20 to refrain from performing the intended D2D radio transmission on the candidate set of radio resources.

As mentioned above, there may be situations when there is a conflict of the intended D2D radio transmission by the first UE 20 and an intended transmission by the second UE 30, in particular an intended D2D radio transmission by the second UE 30. In such cases, the second UE 30 may also consider a priority of at least one of the intended D2D radio transmissions when setting the ML indicator. As mentioned above, the priority of the intended D2D radio transmission may be indicated in terms of a PPPP. For example, the second UE 30 could compare the priority of the intended D2D radio transmission by the first UE 20, as indicated by the SCI 202, to the priority of the intended D2D radio transmission by the second UE 30. If the priority of the intended D2D radio transmission by the second UE 30 is higher, the second UE 30 may set the ML indicator to the fourth level to indicate a negative acknowledgement and thereby cause the first UE 20 to refrain from performing the intended D2D radio transmission on the candidate set of radio resources. In some scenarios, the setting of the ML indicator could also otherwise depend on the priority of the intended D2D radio transmission by the first UE 20. For example, the second UE 30 could adapt at least one of the thresholds H1, H2, H3 depending on the priority of the intended D2D radio transmission by the first UE 20. In this way, it can for example be achieved that the indicated availability status is more favorable in the case of a high priority D2D radio transmission and/or that the indicated availability status is less favorable in the case of a low priority D2D radio transmission.

The feedback message 204 may be transmitted with a specific timing defined in relation to the SCI 202 indicating the first UE's intention to perform the D2D radio transmission. For example, the feedback message could be sent a given number of time slots, e.g., defined in terms of subframes or TTIs, and/or a given number of modulation symbols after transmission of the SCI 202 by the first UE 20. For example, the UE 30 could send the feedback message 204 within the same time slot as the SCI 202, but using later modulation symbols. Further, the UE 30 could send the feedback message 204 in the time slot following the transmission of the SCI 202 or in a subsequent time slot, provided that the feedback message 204 is still sent before the time of the intended D2D radio transmission.

As indicated in FIG. 2, the feedback message 204 may also indicate an alternative set of resources to be used for the intended D2D radio transmission. The second UE 30 may determine the alternative set of resources based on the sensing performed by the second UE 30 and/or based on other information locally available at the second UE 30. The second UE 30 may determine the alternative set of resources in a similar manner as described above for the determination of the candidate set of resources by the first UE 20. The second UE 30 may also determine the alternative set of resources in terms of a TDM (Time Division Multiplexing) pattern indicating time slots in which the candidate set of resources is available from the perspective of the second UE 30. Such TDM pattern could for example be indicated in terms of a bitmap. The TDM pattern may be defined with respect to the time slot in which the first UE 20 intends to perform the D2D radio transmission, e.g., starting with this time slot or the subsequent time slot. In some cases, the second UE 30 may send the indication of the alternative set of radio resources only in when setting the ML indicator to the fourth level to indicate a negative acknowledgement. However, it would also possible to send the indication of the alternative set of radio resources also in other cases, in order to provide the first UE 20 with additional information for making an appropriate final selection of radio resources to be used for the D2D radio transmission. For example, the SCI 202 could indicate the candidate set of resources in terms of PRBs to be used for the intended D2D radio transmission, and the feedback message could indicate in which time slots these PRBs are available from the perspective of the second UE 30.

In the example of FIG. 2, the first UE 20 receives the feedback message 204 and uses the information provided by the feedback message 204, and typically also other information available at the first UE 20, such as information from continued sensing of the resource pool, as indicated by block 205, to control the D2D radio transmission 206, This may in particular involve deciding whether or in which way to use the candidate set of resources for performing the D2D radio transmission 206. For example, if the ML indicator was set to the first level, indicating a positive acknowledgement by the second UE 30, the first UE 20 may decide to perform the D2D radio transmission 206 on the candidate set of resources. On the other hand, if the ML indicator was set to the fourth level, indicating a negative acknowledgement by the second UE 30, the first UE 20 may decide refrain from performing the D2D radio transmission 206 on the candidate set of resources, either by selecting other radio resources or even by completely refraining from performing the D2D radio transmission. The selection of other radio resources may be accomplished on the basis of the above-mentioned indication of an alternative set of radio resources in the feedback message 204. For example, the first UE 20 could select the other radio resources by determining an intersection of PRBs defining the candidate set of resources with the above-mentioned TDM pattern indicated in the feedback message 204. In the cases where the ML indicator was set to an intermediate level, e.g., the second level or the third level, the first UE 20 may apply further criteria when deciding whether to perform the D2D radio transmission 206 on the candidate set of resources, e.g., the priority of the D2D radio transmission or the availability of other radio resources from the perspective of the first UE 20.

In the scenario of FIG. 2, the ML indicator is also used to indicate the positive acknowledgement or the negative acknowledgement. However, it would also possible to implicitly indicate a positive acknowledgement or negative acknowledgement by controlling whether to send the feedback message 204, For example, the second UE 30 could send the feedback message 204 only for indicating a negative acknowledgement and use the ML indicator to additionally indicate the availability status of the candidate set of resources from the perspective of the second UE 30. The first UE 20 could then use the information on the availability status to decide whether to follow the negative acknowledgement and refrain from performing the D2D radio transmission 206 on the candidate set of resources or to neglect the negative acknowledgement and perform the D2D radio transmission 206 on the candidate set of resources. On the side of the first UE 20, absence of the feedback message 204 could then be interpreted as a positive acknowledgement, resulting in unconditional usage of the candidate set of radio resources for performing the D2D radio transmission. In another scenario, the second UE 30 could send the feedback message 204 only for indicating a positive acknowledgement, and on the side of the first UE 20 absence of the feedback message 204 could in then be interpreted as a positive acknowledgement, resulting in the first UE 20 unconditionally refraining from performing the D2D radio transmission on the candidate set of resources. The first UE 20 may conclude that the feedback message 204 is absent if it is not received within a given time interval after sending the SCI 202 or at a given time before the time of the intended D2D radio transmission.

Figure 3:
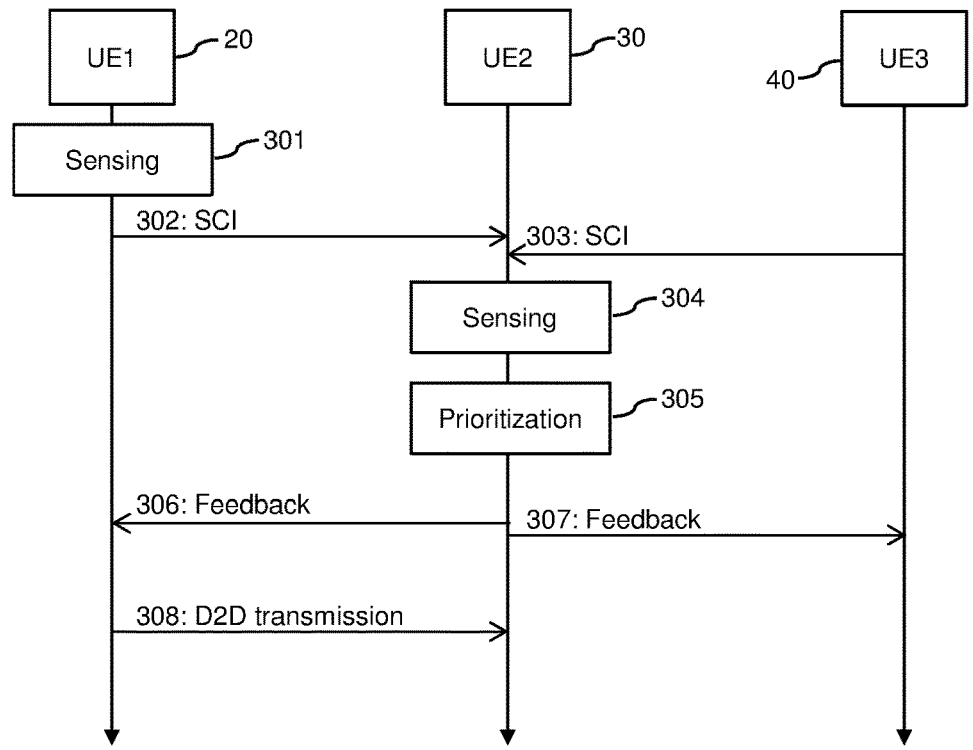
FIG. 3 illustrates a further example of processes in which a D2D radio transmission is controlled according to an embodiment of the invention.

FIG. 3 shows an example of processes in which a D2D radio transmission is controlled based on the principles as outlined above. The processes of FIG. 3 involve a first UE 20 (UE1), a second UE 30 (UE2), and a third UE 40 (UE3). With respect to the concepts as outlined above, the first UE 20 acts as the transmitting radio device. The second UE 30 acts as the receiving radio device. The third UE 40 acts as another transmitting radio device, it is noted that the UEs 20, 30, 40 could correspond to any of the entities 11, 12, 13, 14, 15 as illustrated in FIG. 1.

In the example of FIG. 3, the first UE 20 senses the resource pool to select a first candidate set of radio resources to be used for a D2D radio transmission by the first UE 20, as illustrated by block 301. The sensing of block 301 may be performed as described above. That is to say, the first UE 20 may initially assume all resources of the resource pool are available and then successively exclude resources which are found to be booked or reserved by another UE, e.g., based on SAs received from the other UEs. Further, the first UE 20 may exclude resources for which the UE measures a received signal strength, e.g., in terms of RSRP or RSSI, is above a threshold. From the remaining resources, the first UE 20 may then select the first candidate set of resources, e.g., by selecting the first set of candidate resources with the lowest total RSSI.

The first UE 20 then sends SCI 302 to the second UE 30. The SCI 302 may be transmitted in a broadcast mode, so that the SCI 302 is receivable not only by the second UE 30, but also by other UEs located in a transmission range of the first UE 20. In the following it is assumed that the first UE 20 and the third UE 40 are located out of each other's transmission range, so that the third UE 40 constitutes a hidden node from the perspective of the first UE 20 and the first UE 20 constitutes a hidden node from the perspective of the third UE 40. Accordingly, the third UE 40 cannot receive the SCI 302. It is noted that it would also possible that the SCI 302 is transmitted in a unicast mode, i.e., addressed only to the second UE 30, or in a multicast mode, i.e., addressed to a group of UEs which includes the second UE 30, but not the third UE 40, also with the effect that the SCI 302 is not received by the third UE 40, even if it would be within the transmission range of the first UE 20.

The SCI 302 indicates to one or more other UEs, in particular to the second UE 30, that the first UE 20 intends to perform a D2D radio transmission on the candidate set of radio resources. In the illustrated example, the SCI 302 carries a SA for the intended D2D radio transmission. Accordingly, the SCI 302 includes an indication of the first candidate set of resources. The SCI 302 may also include a reservation of the first candidate set of resources for multiple future time slots, e.g, in order to address a need to periodically or otherwise repeatedly transmit data to the second UE 30. Still further, the SCI 302 may indicate a priority of the intended D2D radio transmission. For example, such priority could be indicated by a PPPP in the SCI 302.

In the example of FIG. 3, it is assumed that also the third UE 40 intends to perform a D2D radio transmission on a second candidate set of radio resources which at least partially overlaps with the first candidate set of radio resources selected by the first UE 20. The selection of the second set of candidate resources by the third UE 40 may be accomplished in a similar manner as the selection of the first set of candidate resources by the first UE 20, e.g., based on sensing of the resource pool.

In view of its intended D2D radio transmission, the third UE 40 sends SCI 303 to the second UE 30. Similar to the SCI 302, the SCI 303 may be transmitted in a broadcast mode, so that the SCI 303 is receivable not only by the second UE 30, but also by other UEs located in a transmission range of the third UE 40. However, since the first UE 20 and the third UE 40 are assumed to be located out of each other's transmission range, the first UE 40 cannot receive the SCI 303. Also here it is noted that it would also possible that the SCI 303 is transmitted in a unicast mode, i.e., addressed only to the second UE 30, or in a multicast mode, i.e., addressed to a group of UEs which includes the second UE 30, but not the first UE 40, also with the effect that the SCI 303 is not received by the first UE 20, even if it would be within the transmission range of the third UE 40.

The SCI 303 indicates to one or more other UEs, in particular to the second UE 30, that the third UE 40 intends to perform a D2D radio transmission on the second candidate set of radio resources. In the illustrated example, the SCI 303 carries a SA for the intended D2D radio transmission. Accordingly, the SCI 303 includes an indication of the second candidate set of resources. The SCI 303 may also include a reservation of the second candidate set of resources for multiple future time slots, e.g., in order to address a need to periodically or otherwise repeatedly transmit data to the second UE 30. Still further, the SCI 303 may indicate a priority of the intended D2D radio transmission by the third UE 40. For example, such priority could be indicated by a PPPP in the SCI 303.

As further illustrated, the second UE 30 receives the SCI 302 and the SCI 303 and detects that the first UE 20 and the third UE 40 intend to perform D2D radio transmissions on overlapping radio resources, i.e., that the intended D2D radio transmissions are conflicting. As illustrated by block 304, also the second UE 30 performs sensing of the resource pool. At least a part of the sensing may be performed in response to receiving the SCI 302 and the SCI 303. The second UE 30 uses the results of sensing to determine an availability status of the candidate sets of radio resources from the perspective of the second UE 30.

As illustrated by block 305, the second UE 30 then performs prioritization of the intended D2D radio transmissions. The prioritization may for example be based on the priority of the intended D2D radio transmission by the first UE 20, e.g., as indicated by a PPPP in the SCI 302, and the priority of the intended D2D radio transmission by the third UE 40, e.g., as indicated by a PPPP in the SCI 303.

The prioritization of the D2D radio transmissions may also be based on a capability of the second UE 20. For example, if the second UE 20 has an advanced receiver, so that it is able to receive the two co-channel transmissions from the first UE 20 and the third UE 40, it may decide that both D2D radio transmissions are possible at the same time. If the second UE 30 has a simple receiver, it may decide that only one of the intended D2D radio transmissions is possible at the same time and prioritize one of the intended D2D radio transmissions over the other.

The prioritization may also be based on a received signal strength measured from the first UE 20 and a received signal strength measured from the third UE 40. Based on these received signal strengths, the second UE 30 can decide whether the second UE 20 can receive both intended D2D radio transmissions at the same time or if interference of one of the intended D2D radio transmissions on the other is so severe that it needs to prioritize one of the intended D2D radio transmissions over the other.

As further illustrated, the second UE 30 sends a first feedback message 306 to the first UE 20 and a second feedback message 307 to the third UE 40. The feedback message 306 indicates the availability status of the first candidate set of resources as determined by the second UE 30. The feedback message 306 can be conveyed on a control channel, e.g., in SCI transmitted by the second UE 30, or on a data channel, e.g., as part of a D2D radio transmission performed by the second UE 30. The feedback message 306 may be transmitted in a broadcast mode, so that the feedback message 306 is receivable not only by the first UE 20, but also by other UEs located in a transmission range of the second UE 30, e.g., by the third UE 40. However, it is also possible that the feedback message 306 is transmitted in a unicast mode, i.e., addressed only to the first UE 20, or in a multicast mode, i.e., addressed to a group of UEs which includes the first UE 20. The feedback message 307 indicates the availability status of the second candidate set of resources as determined by the second UE 30. The feedback message 307 can be conveyed on a control channel, e.g., in SCI transmitted by the second UE 30, or on a data channel, e.g., as part of a D2D radio transmission performed by the second UE 30. The feedback message 307 may be transmitted in a broadcast mode, so that the feedback message 307 is receivable not only by the third UE 40, but also by other UEs located in a transmission range of the second UE 30, e.g., by the first UE 20. However, it is also possible that the feedback message 307 is transmitted in a unicast mode, i.e., addressed only to the third UE 40, or in a multicast mode, i.e., addressed to a group of UEs which includes the third UE 40.

In the illustrated example, the feedback message 306 includes an ML indicator to indicate the availability status of the first candidate set of radio resources. As mentioned above, the ML indicator indicates the availability status in terms of at least three different levels. These multiple levels may for example correspond to different levels of measured interfering signal strength on the first candidate set of resources, e.g., in terms of RSRP or RSSI, or to different congestion levels of the first candidate set of resources. For example, the ML indicator could indicate the availability status in terms of four different levels by using two bits. If the interfering signal strength on the first candidate set of resources measured by the second UE 30 is denoted by Y1, three threshold levels H11, H12 and H13 could be configured, and the ML indicator be set to the first level (e.g., encoded by "11") if $Y1 \le H11$, to the second level (e.g., encoded by "10") if $H11 < Y1 \le H12$, to the third level (e.g., encoded by "01") if $H12 < Y1 \le H13$; and to the fourth level (e.g., encoded by "00") if $Y1 > H13$. The first level may be defined to indicate a positive acknowledgement, i.e., that the second UE 30 approves the D2D radio transmission on the first candidate set of radio resources. Similarly, the fourth level could be defined to indicate a negative acknowledgement, i.e., that the second UE 30 disapproves the D2D radio transmission on the first candidate set of radio resources, e.g., because second UE 30 considers the first candidate set of resources to be at least partially occupied.

Similarly, the feedback message 307 includes an ML indicator to indicate the availability status of the second candidate set of radio resources, which indicates the availability status in terms of at least three different levels. These multiple levels may for example correspond to different levels of measured interfering signal strength on the second candidate set of resources, e.g., in terms of RSRP or RSSI, or to different congestion levels of the second candidate set of resources. For example, the ML indicator could indicate the availability status in terms of four different levels by using two bits. If the interfering signal strength on the second candidate set of resources measured by the second UE 30 is denoted by Y2, three threshold levels H21, H22 and H23 could be configured and the ML indicator be set to the first level (e.g., encoded by "11") if Y2≤H21, to the second level (e.g., encoded by "10") if H21<Y2≤H22, to the third level (e.g., encoded by "01") if H22<Y2≤H23; and to the fourth level (e.g., encoded by "00") if Y2>H23. The first level may be defined to indicate a positive acknowledgement, i.e., that the second UE 30 approves the D2D radio transmission on the second candidate set of radio resources. Similarly, the fourth level could be defined to indicate a negative acknowledgement, i.e., that the second UE 30 disapproves the D2D radio transmission on the second candidate set of radio resources, e.g., because second UE 30 considers the first candidate set of resources to be at least partially occupied.

For each of the feedback messages, the second UE 30 may also base the setting of the ML indicator on further criteria. For example, the second UE 30 could set the ML indicator depending on a capability of the second UE 30. In this way, the setting of the ML indicator may for example also take into account whether the second UE 30 would be capable of successfully receiving and decoding the intended D2D radio transmission. For example, for a certain level of measured interfering signal strength or a certain level of congestion, the second UE 30 could set the ML to the first level if it has advanced receiver and can thus be expected to successfully receive and decode the intended D2D radio transmission at this level of measured interfering signal strength or level of congestion. On the other hand, if the second UE 30 has a simple receiver and thus is expected to not be able to successfully receive and decode the intended D2D radio transmission at this level of measured interfering signal strength or level of congestion, the second UE 30 could set the ML indicator to the fourth level to indicate a negative acknowledgement and thereby cause the respective transmitting UE 20, 40 to refrain from performing the intended D2D radio transmission on the respective candidate set of radio resources. Here, an advanced receiver could for example be a receiver with sufficient processing capabilities to perform MMSE-IRC, SIC, or the like.

As a further example, the second UE 30 could set the ML indicator depending on capabilities like a number of receiver processing chains of the second UE 30, half duplex limitations of the second UE 30, or the like. For example, if the second UE 30 intends to transmit on time resources which overlap with the respective candidate set of resources and cannot receive the intended D2D transmission due to half duplex limitations, the second UE 30 may set the ML indicator to the fourth level to indicate a negative acknowledgement and thereby cause the first UE 20 to refrain from performing the intended D2D radio transmission on the candidate set of radio resources. Similarly, if no receiver chains of the second UE 30 would be available for receiving the intended D2D transmission, the second UE 30 may set the ML indicator to the fourth level to indicate a negative acknowledgement and thereby cause the respective transmitting UE 20, 40 to refrain from performing the intended D2D radio transmission on the respective candidate set of radio resources.

As mentioned above, there may be situations when there is a conflict of the intended D2D radio transmission by the respective transmitting UE 20, 40 and an intended transmission by the second UE 30, in particular an intended D2D radio transmission by the second UE 30, In such cases, the second UE 30 may also consider a priority of at least one of the intended D2D radio transmissions when setting the ML indicator. As mentioned above, the priority of the intended D2D radio transmission may be indicated in terms of a PPPP. For example, the second UE 30 could compare the priority of the intended D2D radio transmission by the first UE 20, as indicated by the SCI 302, to the priority of the intended D2D radio transmission by the second UE 30. If the priority of the intended D2D radio transmission by the second UE 30 is higher, the second UE 30 may set the ML indicator in the feedback message 306 to the fourth level to indicate a negative acknowledgement and thereby cause the first UE 20 to refrain from performing the intended D2D radio transmission on the first candidate set of radio resources. Similarly, the second UE 30 could compare the priority of the intended D2D radio transmission by the third UE 40, as indicated by the SCI 303, to the priority of the intended D2D radio transmission by the second UE 30. If the priority of the intended D2D radio transmission by the second UE 30 is higher, the second UE 30 may set the ML indicator in the feedback message 307 to the fourth level to indicate a negative acknowledgement and thereby cause the third UE 40 to refrain from performing the intended D2D radio transmission on the second candidate set of radio resources.

In the example of FIG. 3, the settings of the ML indicator in the feedback messages 306, 307 may be based on the results of prioritization at block 305. For example, if based on capability of the second UE 30 and/or measured received signal strengths, the second UE 30 is expected to be able to receive the intended D2D radio transmissions simultaneously, the second UE 30 may set the ML indicator in both feedback messages to indicate at least a conditional positive acknowledgement. If the second UE 30 is expected to be able to receive only one of the intended D2D radio transmissions at a time, the second UE may set the ML indicators in the feedback messages 306, 307 to indicate a negative acknowledgement to that one of the first UE 20 and the third UE 40 where the PPP indicates the lower priority of the intended D2D radio transmission.

The feedback message 306 may be transmitted with a specific timing defined in relation to the SCI 302 indicating the first UE's 20 intention to perform the D2D radio transmission. Similarly, the feedback message 307 may be transmitted with a specific timing defined in relation to the SCI 303 indicating the third UE's 40 intention to perform the D2D radio transmission. For example, the feedback message 306, 307 could be sent a given number of time slots and/or a given number of modulation symbols after transmission of the respective SCI 302, 303, e.g., within the same time slot, but using later modulation symbols, or in a specific subsequent time slot before the time of the intended D2D radio transmission.

The feedback message 306 may also indicate a first alternative set of resources to be used for the intended D2D radio transmission by the first UE 20, and the feedback message 307 may indicate a second alternative set of resources to be used for the intended D2D radio transmission by the third UE 20. The second UE 30 may determine the alternative sets of resources based on the sensing performed by the second UE 30 and/or based on other information locally available at the second UE 30. The second UE 30 may determine the alternative sets of radio resources in terms of a TDM pattern indicating time slots in which the respective candidate set of resources is available from the perspective of the second UE 30. Such TDM pattern could for example be indicated in terms of a bitmap. In some cases, the second UE 30 may send the indication of the alternative set of radio resources only in when setting the ML indicator in the respective feedback message 306, 307 to the fourth level to indicate a negative acknowledgement. However, it would also possible to send the indication of the alternative set of radio resources also in other cases, in order to provide the respective transmitting UE 20, 40 with additional information for making an appropriate final selection of radio resources to be used for its intended D2D radio transmission. For example, the SCI 302, 303 could indicate the respective candidate set of resources in terms of PRBs to be used for the intended D2D radio transmission, and the respective feedback message 306, 307 could indicate in which time slots these PRBs are available from the perspective of the second UE 30.

The above-mentioned indications of alternative sets of radio resources in the feedback message 306 or in the feedback message 307 may also take into account effects of in-band emission. For example, when assuming that the third UE 40 will perform its intended D2D radio transmission in a given time slot, the second UE 30 may use the indication of the first alternative set of radio resources in the feedback message 306 to indicate to the first UE 20 to perform its intended D2D radio transmission in another time slot so that the time gap between the two time slots is sufficient to avoid in-band emission issues which might disturb the D2D radio transmission by the third UE 40, In another example, the second UE 30 may use the indication of the first alternative set of radio resources in the feedback message 306 to indicate to the first UE 20 to perform its intended D2D radio transmission in the same time slot as the third UE 40, but on different frequency resources. In this example, the indication of the first alternative set of radio resources may indicate a TDM pattern indicating multiple time slots and a set of PRBs or frequency subchannels that are deemed to be available in each of these time slots.

In the example of FIG. 3, the first UE 20 receives the feedback message 306 and uses the information provided by the feedback message 306, and typically also other information available at the first UE 20, such as information from continued sensing of the resource pool, to control its intended D2D radio transmission. Similarly, the third UE 40 receives the feedback message 307 and uses the information provided by the feedback message 307, and typically also other information available at the third UE 40, such as information from continued sensing of the resource pool, to control its intended D2D radio transmission. In the example of FIG. 3, it is assumed that the intended D2D radio transmission by the first UE 20 was prioritized over the intended D2D radio transmission by the third UE 40, e.g., by setting the ML indicator in the feedback message 306 to a higher level than the ML indicator in the feedback message 307, with the effect that the first UE 20 performs its intended D2D radio transmission on the first candidate set of radio resources, as indicated by 308, while the third UE 40 refrains from performing its intended D2D radio transmission.

It is noted that also in the example of FIG. 3 a positive acknowledgement or negative acknowledgement could also be indicated implicitly by controlling whether to send the feedback message 306, 307. For example, the second UE 30 could send the feedback message 306, 307 only for indicating a negative acknowledgement and use the ML indicator to additionally indicate the availability status of the candidate set of resources from the perspective of the second UE 30. The respective transmitting UE 20, 40 could then use the information on the availability status to decide whether to follow the negative acknowledgement. On the side of the respective transmitting UE 20, 40 absence of the feedback message 406, 307 could then be interpreted as a positive acknowledgement, resulting in unconditional usage of the respective candidate set of radio resources for performing the D2D radio transmission. In another scenario, the second UE 30 could send the feedback message 306, 307 only for indicating a positive acknowledgement, and on the side of the respective transmitting UE 20, 40 absence of the feedback message 306, 307 could in then be interpreted as a positive acknowledgement, resulting in the respective transmitting UE 20, 40 unconditionally refraining from performing the intended D2D radio transmission on the respective candidate set of resources.

Figure 4:
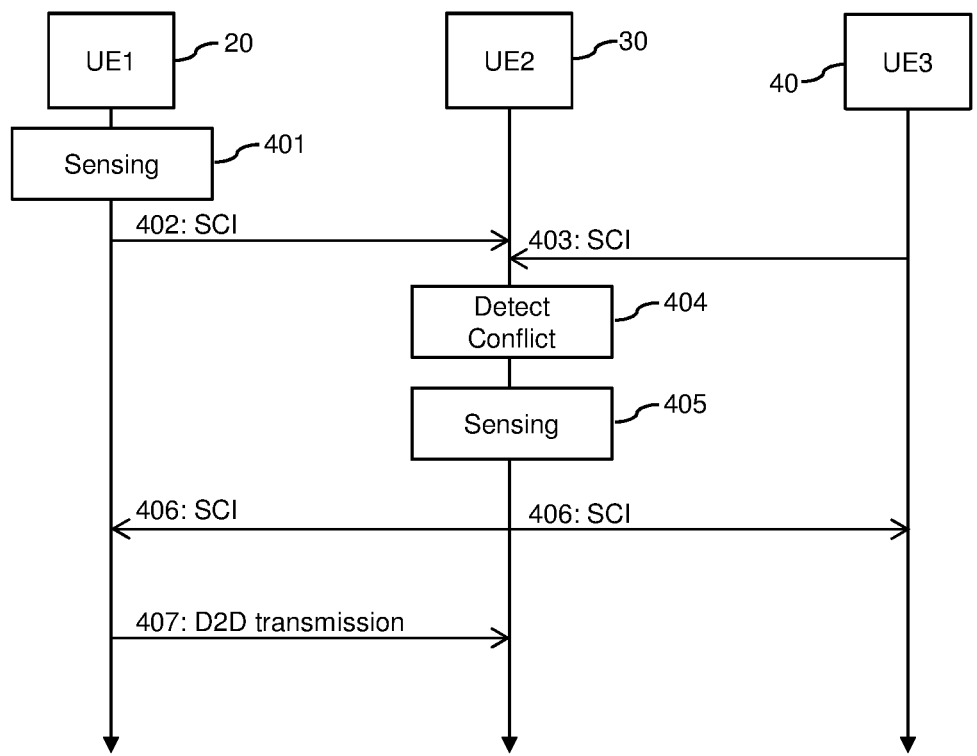
FIG. 4 illustrates a further example of processes in which a D2D radio transmission is controlled according to an embodiment of the invention.

In some scenarios, sending of the feedback message with the ML indicator could also be omitted. Processes according to a corresponding example are illustrated in FIG. 4. The processes of FIG. 4 involve a first UE 20 (UE1), a second UE 30 (UE2), and a third UE 40 (UE3). With respect to the concepts as outlined above, the first UE 20 acts as the transmitting radio device. The second UE 30 acts as the receiving radio device. The third UE 40 acts as another transmitting radio device, it is noted that the UEs 20, 30, 40 could correspond to any of the entities 11, 12, 13, 14, 15 as illustrated in FIG. 1.

In the example of FIG. 4, the first UE 20 senses the resource pool to select a first candidate set of radio resources to be used for a D2D radio transmission by the first UE 20, as illustrated by block 401. The sensing of block 401 may be performed as described above. That is to say, the first UE 20 may initially assume all resources of the resource pool are available and then successively exclude resources which are found to be booked or reserved by another UE, e.g., based on SAs received from the other UEs. Further, the first UE 20 may exclude resources for which the UE measures a received signal strength, e.g., in terms of RSRP or RSSI, is above a threshold. From the remaining resources, the first UE 20 may then select the first candidate set of resources, e.g., by selecting the first set of candidate resources with the lowest total RSSI.

The first UE 20 then sends SCI 402 to the second UE 30. The SCI 402 may be transmitted in a broadcast mode, so that the SCI 402 is receivable not only by the second UE 30, but also by other UEs located in a transmission range of the first UE 20. In the following it is assumed that the first UE 20 and the third UE 40 are located out of each other's transmission range, so that the third UE 40 constitutes a hidden node from the perspective of the first UE 20 and the first UE 20 constitutes a hidden node from the perspective of the third UE 40. Accordingly, the third UE 40 cannot receive the SCI 402. It is noted that it would also possible that the SCI 402 is transmitted in a unicast mode, i.e., addressed only to the second UE 30, or in a multicast mode, i.e., addressed to a group of UEs which includes the second UE 30, but not the third UE 40, also with the effect that the SCI 402 is not received by the third UE 40, even if it would be within the transmission range of the first UE 20.

The SCI 402 indicates to one or more other UEs, in particular to the second UE 30, that the first UE 20 intends to perform a D2D radio transmission on the candidate set of radio resources. In the illustrated example, the SCI 402 carries a SA for the intended D2D radio transmission. Accordingly, the SCI 402 includes an indication of the first candidate set of resources. The SCI 402 may also include a reservation of the first candidate set of resources for multiple future time slots, e.g., in order to address a need to periodically or otherwise repeatedly transmit data to the second UE 30. Still further, the SCI 402 may indicate a priority of the intended D2D radio transmission. For example, such priority could be indicated by a PPPP in the SCI 402.

In the example of FIG. 4, it is assumed that also the third UE 40 intends to perform a D2D radio transmission on a second candidate set of radio resources which at least partially overlaps with the first candidate set of radio resources selected by the first UE 20. The selection of the second set of candidate resources by the third UE 40 may be accomplished in a similar manner as the selection of the first set of candidate resources by the first UE 20, e.g., based on sensing of the resource pool.

In view of its intended D2D radio transmission, the third UE 40 sends SCI 403 to the second UE 30. Similar to the SCI 402, the SCI 403 may be transmitted in a broadcast mode, so that the SCI 403 is receivable not only by the second UE 30, but also by other UEs located in a transmission range of the third UE 40. However, since the first UE 20 and the third UE 40 are assumed to be located out of each other's transmission range, the first UE 40 cannot receive the SCI 403. Also here it is noted that it would also possible that the SCI 403 is transmitted in a unicast mode, i.e., addressed only to the second UE 30, or in a multicast mode, i.e., addressed to a group of UEs which includes the second UE 30, but not the first UE 40, also with the effect that the SCI 403 is not received by the first UE 20, even if it would be within the transmission range of the third UE 40.

The SCI 403 indicates to one or more other UEs, in particular to the second UE 30, that the third UE 40 intends to perform a D2D radio transmission on the second candidate set of radio resources. In the illustrated example, the SCI 403 carries a SA for the intended D2D radio transmission. Accordingly, the SCI 403 includes an indication of the second candidate set of resources. The SCI 403 may also include a reservation of the second candidate set of resources for multiple future time slots, e.g., in order to address a need to periodically or otherwise repeatedly transmit data to the second UE 30, Still further, the SCI 403 may indicate a priority of the intended D2D radio transmission by the third UE 40. For example, such priority could be indicated by a PPPP in the SCI 403.

As illustrated, the second UE 30 receives the SCI 402 and the SCI 403. As illustrated by block 404, also the second UE 30 performs sensing of the resource pool. At least a part of the sensing may be performed in response to receiving the SCI 402 and the SCI 403. The second UE 30 uses the results of sensing to determine an availability status of the candidate sets of radio resources from the perspective of the second UE 30. As further illustrated by block 405, the second UE 30 detects based on the received SCI 402, 403 that the first UE 20 and the third UE 40 intend to perform D2D radio transmissions on overlapping radio resources, i.e., that the intended D2D radio transmissions are conflicting.

In the example of FIG. 4, the second UE 30 decides to refrain from sending feedback messages to the first UE 20, 40, e.g., like in the example of FIG. 3, but rather indicates the conflict to the first UE 20 and to the third UE 40 by sending SCI 406 indicating an intention of the second UE 30 to perform a D2D radio transmission on the conflicting resources. The conflicting resources may for example be determined as an overlapping part of the first candidate set of resources and the second candidate set of resources. The SCI 405 carries a SA for the intended D2D radio transmission by the second UE 30 on the conflicting radio resources. Accordingly, the SCI 405 includes an indication of the conflicting resources, e.g., in terms of PRBs or frequency subchannels. The SCI 405 may also include a reservation of the conflicting resources for multiple future time slots, e.g., in order to address a need to periodically or otherwise repeatedly transmit data from second UE 30. Still further, the SCI 405 may indicate a priority of the intended D2D radio transmission by the second UE 30. For example, such priority could be indicated by a PPPP in the SCI 405.

In the example of FIG. 4, the SCI 406 is assumed to be transmitted in a broadcast mode, so that the SCI 406 is receivable both by the first UE 20 and by the third UE 40, and also by other UEs located in a transmission range of the second UE 30. However, it is noted that it would also possible that the SCI 405 is transmitted in a unicast mode, e.g., by using a unicast message addressed only to the first UE 20 and a further unicast message addressed only to the third UE 40. Further, it would also possible that the SCI 405 is transmitted in a multicast mode, e.g., in a multicast message addressed to a group of UEs which includes the first UE 20 and the third UE 40.

In the example of FIG. 4, the first UE 20 and the third UE 40 detect the conflict of the first candidate set of resources and the second candidate set of resources based on the SA received with the SCI 405 received from the second UE 30 and will thus respectively proceed by selecting a different candidate resources for the intended D2D radio transmission. This may be involve performing processes like illustrated in FIG. 2 or 3. The second UE 30 may in turn utilize the conflicting radio resources indicated by the SCI 405 to perform a D2D radio transmission. The variant in the processes of FIG. 4, in which the conflict is indicated by sending SCI with an SA for the conflicting radio resources may thus be particularly useful in scenarios where the second UE 30 itself needs to perform a D2D radio transmission, e.g., a D2D radio transmission having a higher priority than the D2 D radio transmission is indicated by the first UE 20 and the third UE 40.

As mentioned above, the transmitting UE 20, 40 may also indicate a reservation of the respective candidate set of resources for one or more future time slots. In such cases, the above-mentioned feedback message, e.g., may be sent once, with the ML indicator indicating the availability status for all these time slots. Alternatively, multiple feedback messages with the ML indicator may be sent, e.g., to provide the ML indicator individually for at least some of the multiple timeslots. In some cases, the ML indicator could also be sent with respect to groups of the multiple time slots. In such cases, the feedback message with the ML indicator may be transmitted with a specific timing defined in relation the next reserved time slot, e.g., defined in terms of subframes or TTIs, and/or in terms of a given number of modulation symbols.

Figure 5:
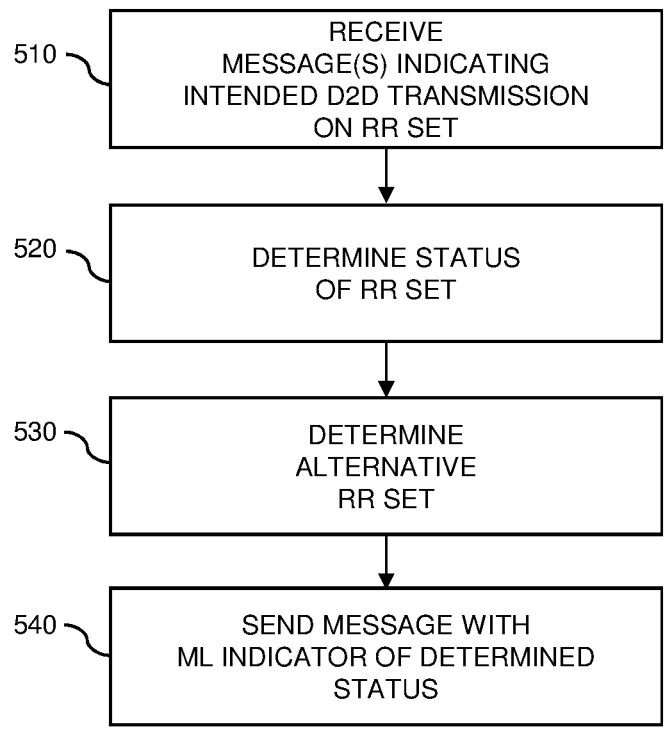
FIG. 5 shows a flowchart for schematically illustrating a receiver based method according to an embodiment of the invention.

FIG. 5 shows a flowchart for illustrating a method of controlling D2D radio transmissions in a wireless communication network. The method of FIG. 5 may be used for implementing the illustrated concepts in a receiving radio device, such as in the second UE 30 of the above-mentioned examples. The D2D radio transmissions may for example be used for conveying V2X messages.

If a processor-based implementation of the radio device is used, at least some of the steps of the method of FIG. 5 may be performed and/or controlled by one or more processors of the radio device. Such radio device may also include a memory storing program code for implementing at least some of the below described functionalities or steps of the method of FIG. 5.

At step 510, the radio device receives a first message from a further radio device, such as the above-mentioned first UE 20. The first message indicates an intention of the further radio device to perform a D2D radio transmission on a set of radio resources. The intended D2D radio transmission may be a unicast transmission addressed to the radio device. Alternatively, the intended D2D radio transmission may be a multicast transmission addressed to a group of radio devices including the radio device. Further, the D2D radio transmission could be a broadcast transmission receivable by the radio device and one or more other radio devices. The set of radio resources may include one or more resources defined in terms of time domain multiplexing and/or frequency domain multiplexing. For example, in the time domain the resources could be defined in terms of time slots or modulation symbols. In the frequency domain the resources could be defined in terms of frequency subchannels. In the time domain and frequency domain, the resources could be defined in terms of PRBs.

The first message may be received on a control channel. For example, the first message could be received in SCI transmitted on a PSCCH. The first message may be received in a broadcast transmission receivable by the radio device and one or more other radio devices. Alternatively, the first message could be received in a unicast message addressed to the radio device or in a multicast message addressed to a group of radio devices including the radio device. The first message may indicate the set of radio resources, e.g., by an SA conveyed in the first message. Further, the first message may indicate a priority of the D2D radio transmission by the further radio device, e.g., in terms of a PPPP. The SCI 202, 302, and 402 in FIGS. 2, 3, and 4 constitutes an example of such first message.

At step 520, the radio device determines a status of the set of radio resources. This may involve sensing the set of radio resources, e.g., the radio device performing measurements on the set of radio resources so as to determine signal levels on the radio resources, e.g., in terms of RSRP and RSSI.

In some scenarios, the radio device may determine the status of the set of radio resources depending on an intention of the radio device itself to perform a D2D radio transmission on the set of radio resources.

In some scenarios, the radio device may determining the status of the set of radio resources depending on a priority of the D2D radio transmission by the radio device.

In some scenarios, the radio device may determine the status of the set of radio resources depending on a priority of the D2D radio transmission by the further radio device, e.g., as indicated by the first message.

At optional step 530, the radio device may determine an alternative set of radio resources. The radio device may determine the alternative set of radio resources depending on the status of the set of radio resources determined at step 520. Further, the radio device may determine the alternative set of radios and resources based on sensing a pool of radio resources. The alternative set of radio resources may for example be determined in terms of a TDM pattern indicating time slots with radio resources deemed to be available by the radio device.

At step 540, the radio device sends a second message in response to the first message. The second message comprises an indicator which indicates the determined status of the set of radio resources determined at step 520. The indicator is a ML indicator which indicates the status in terms of at least three levels. The levels may represent different signal levels detected on the set of radio resources. At least one of the levels may indicate that the set of radio resources is at least partially occupied, e.g., like the above-mentioned negative acknowledgement. At least one of the levels indicates that the set of radio resources is unoccupied, e.g., like the above-mentioned positive acknowledgement.

The second message may be sent on a control channel. For example, the second message could be sent in SCI transmitted on a PSCCH, Alternatively, the second message could be sent on a data channel, e.g., in a PSSCH transmission. The second message may be sent in a broadcast transmission receivable by the further radio device and one or more other radio devices. Alternatively, the second message could be sent in a unicast transmission addressed to the further radio device or in a multicast transmission addressed to a group of radio devices including the further radio device. The feedback messages 204, 306, and 307 in FIGS. 2, and 3 constitute examples of such second message.

In some scenarios, the radio device may set the indicator depending on a capability of the radio device. For example, such capability may depend on whether the radio device is equipped with an advanced receiver on a simple receiver. Further, such capability may correspond to a capability to perform interference rejection or interference cancellation.

In some scenarios, the second message may indicate an alternative set of radio resources, e.g., as determined at step 530. The second message may for example comprise a bitmap a bitmap which indicates the alternative set of radio resources. The bitmap may for example represent a TDM pattern.

In some scenarios step 510 may also involve that the radio device receives a third message from another further radio device, such as the above-mentioned third UE 40. Similar to the first message, the third message may indicate an intention of the other further radio device to perform a D2D radio transmission on the set of radio resources. In such cases, step 520 may further involve that the radio device determines the status of the set of radio resources depending on the third message. For example, the radio device may determine the status of the set of radio resources depending on a priority of the device-to-device radio transmission by the other further radio device. Corresponding scenarios are illustrated by the examples of FIGS. 3 and 4.

The third message may be received on a control channel. For example, the third message could be received in SCI transmitted on a PSCCH. The first message may be received in a broadcast transmission receivable by the radio device and one or more other radio devices.

Alternatively, the third message could be received in a unicast message addressed to the radio device or in a multicast message addressed to a group of radio devices including the radio device. The third message may indicate the set of radio resources as intended to be used by the other further radio device, e.g., by an SA conveyed in the third message. Further, the third message may indicate a priority of the D2D radio transmission by the other further radio device, e.g., in terms of a PPPP, The SCI 303 and 404 in FIGS. 3 and 4 constitutes an example of such third message.

In some scenarios, the radio device may detect on the basis of the first message and the third message that there is an intention of the further radio device to perform a D2D radio transmission on the set of radio resources and an intention of the other further radio device to perform a D2D radio transmission on the set of radio resources, i.e., a potential conflict of the two intended D2D radio transmissions. In such cases, the radio device may send a fourth message indicating an intention of the radio device itself to perform a D2D radio transmission on the set of radio resources. A corresponding scenario is illustrated by the example of FIG. 4.

The fourth message may be sent on a control channel. For example, the fourth message could be sent in SCI transmitted on a PSCCH. The fourth message may be sent in a broadcast transmission receivable by the further radio device and the other further radio device. Alternatively, the first message could be sent in a first unicast message addressed to the further radio device and a second unicast message addressed to the other further radio device. Further, the fourth message could be sent in a multicast message addressed to a group of radio devices including the further radio device and the other further radio device. The fourth message may indicate the set of radio resources detected to be conflicting, e.g., by an SA conveyed in the fourth message. Further, the fourth message may indicate a priority of the D2D radio transmission by the radio device, e.g., in terms of a PPPP. The SCI 405 in FIG. 4 constitutes an example of such fourth message.

In some scenarios, the radio device may control depending on the determined status of the set of radio resources whether to send the second message. For example, a positive acknowledgement or a negative acknowledgement could be indicating by not sending the second message.

In some scenarios, the first message indicates an intention of the further radio device to perform a device-to-device radio transmission on the set of radio resources in multiple time slots. For example, the first message may also include a reservation or booking of the set of radio resources for one or more future time slots. In such cases, step 520 may involve that the radio device determines a status of the set of radio resources individually for each of the time slots. Step 540 may then involve that the radio device sends the second message, comprising the indicator which indicates the determined status of the set of radio resources for the time slot, for each of the multiple time slots.

In a similar manner, also step 530 may involve that the alternative set of radio resources is determined individually for each of the multiple time slots, and step 540 may involve that the radio device sends the second message for each of the multiple time slots, to indicate the respective alternative set of radio resources individually for each of the multiple time slots.

Figure 6:
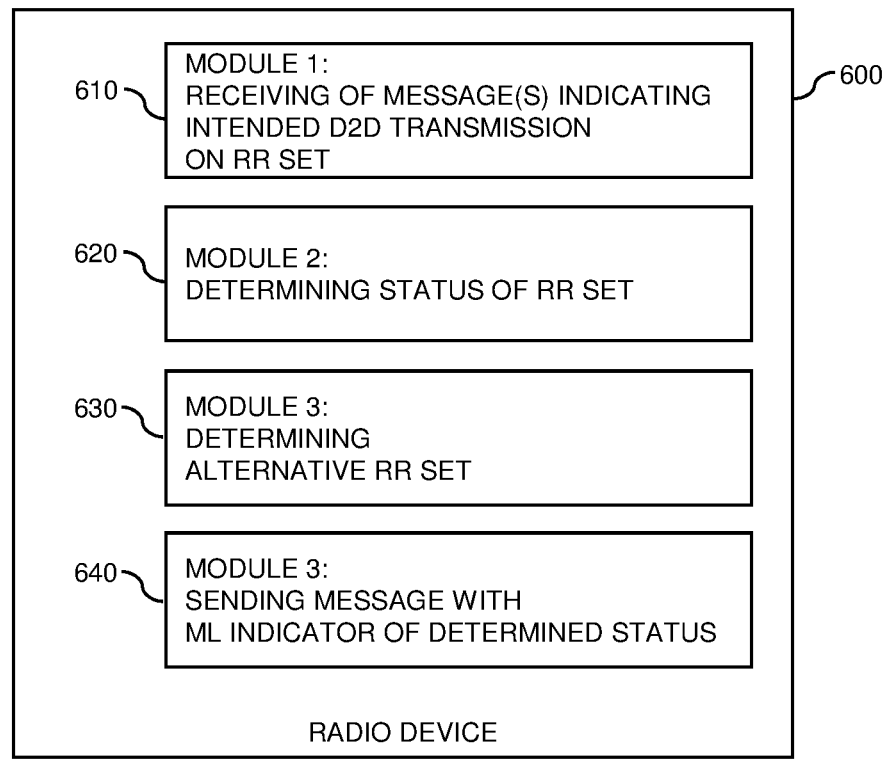
FIG. 6 shows a block diagram for illustrating functionalities of a receiving radio device according to an embodiment of the invention.

FIG. 6 shows a block diagram for illustrating functionalities of a radio device 600 which operates according to the method of FIG. 5. The radio device 600 may for example correspond to the above-mentioned receiving radio device or UE 30. As illustrated, the radio device 600 may be provided with a module 610 configured to receive at least a first message indicating an intention of a further radio device to perform a D2 D radio transmission on a set of radio resources, such as explained in connection with step 510. Further, the radio device 600 may be provided with a module 620 configured to determine a status of the set of radio resources, such as explained in connection with step 520. Further, the radio device 600 may optionally be provided with a module 630 configured to determine an alternative set of radio resources, such as explained in connection with step 530. Further, the radio device 600 may be provided with a module 640 configured to send a second message including an ML indicator of the determined status of the radio resources, such as explained in connection with step 540.

Figure 7:
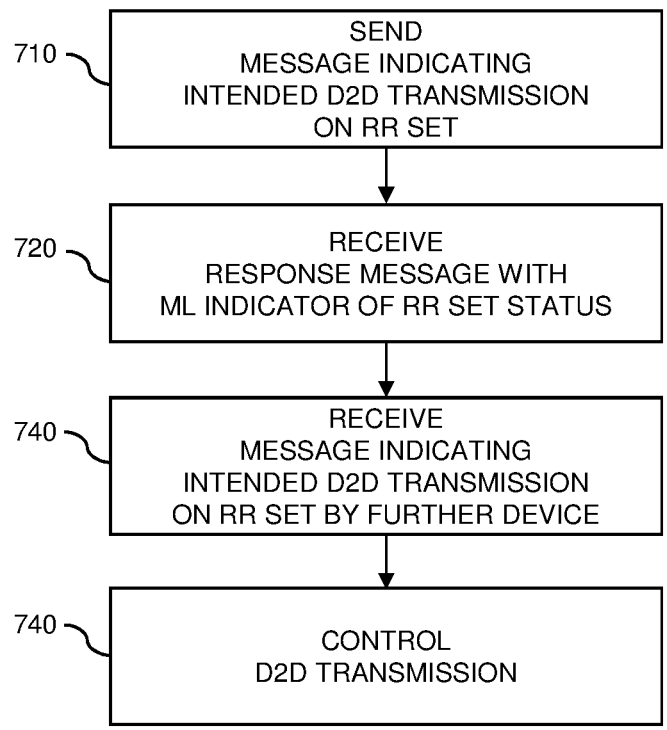
FIG. 7 shows a flowchart for schematically illustrating a transmitter based method according to an embodiment of the invention.

It is noted that the radio device 600 may include further modules for implementing other functionalities, such as known functionalities of a UE supporting V2X or other types of D2D communication. Further, it is noted that the modules of the radio device 600 do not necessarily represent a hardware structure of the radio device 600, but may also correspond to functional elements, e.g., implemented by hardware, software, or a combination thereof, FIG. 7 shows a flowchart for illustrating a method of controlling D2D radio transmissions in a wireless communication network. The method of FIG. 7 may be used for implementing the illustrated concepts in a transmitting radio device, such as in the first UE 20 of the above-mentioned examples. The D2D radio transmissions may for example be used for conveying V2X messages.

If a processor-based implementation of the radio device is used, at least some of the steps of the method of FIG. 7 may be performed and/or controlled by one or more processors of the radio device. Such radio device may also include a memory storing program code for implementing at least some of the below described functionalities or steps of the method of FIG. 7.

At step 710; the radio device sends a first message to a further radio device, such as the above-mentioned second UE 40. The first message indicates an intention of the radio device to perform a D2D radio transmission on a set of radio resources. The intended D2D radio transmission may be a unicast transmission addressed to the radio device. Alternatively, the intended D2D radio transmission may be a multicast transmission addressed to a group of radio devices including the radio device. Further, the D2D radio transmission could be a broadcast transmission receivable by the radio device and one or more other radio devices. The set of radio resources may include one or more resources defined in terms of time domain multiplexing and/or frequency domain multiplexing. For example, in the time domain the resources could be defined in terms of time slots or modulation symbols. In the frequency domain the resources could be defined in terms of frequency subchannels. In the time domain and frequency domain, the resources could be defined in terms of PRBs.

The first message may be sent on a control channel. For example, the first message could be sent in SCI transmitted on a PSCCH. The first message may be sent in a broadcast transmission receivable by the further radio device and one or more other radio devices. Alternatively, the first message could be sent in a unicast message addressed to further the radio device or in a multicast message addressed to a group of radio devices including the further radio device. The first message may indicate the set of radio resources, e.g., by an SA conveyed in the first message. Further, the first message may indicate a priority of the D2D radio transmission by the radio device, e.g., in terms of a PPPP. The SCI 202, 302, and 402 in FIGS. 2, 3, and 4 constitutes an example of such first message.

At step 720, the radio device receives a second message in response to the first message. The second message comprises an indicator which indicates a status of the set of radio resources as determined by the further radio device. The indicator is a ML indicator which indicates the status in terms of at least three levels. The levels may represent different signal levels detected on the set of radio resources. At least one of the levels may indicate that the set of radio resources is at least partially occupied, e.g., like the above-mentioned negative acknowledgement. At least one of the levels indicates that the set of radio resources is unoccupied, e.g., like the above-mentioned positive acknowledgement.

The second message may be received on a control channel. For example, the second message could be received in SCI transmitted on a PSCCH. Alternatively, the second message could be received on a data channel, e.g., in a PSSCH transmission. The second message may be received in a broadcast transmission receivable by the radio device and one or more other radio devices. Alternatively, the second message could be received in a unicast transmission addressed to the radio device or in a multicast transmission addressed to a group of radio devices including the radio device. The feedback messages 204, 306, and 307 in FIGS. 2, and 3 constitute examples of such second message.

In some scenarios, the indicator may depend on a capability of the further radio device. For example, such capability may depend on whether the radio device is equipped with an advanced receiver on a simple receiver. Further, such capability may correspond to a capability to perform interference rejection or interference cancellation.

In some scenarios, the indicator may depend on an intention of the further radio device to perform a D2D radio transmission on the set of radio resources.

In some scenarios, the indicator may depend on a priority of the D2D radio transmission by the further radio device and/or a priority of the D2D radio transmission by the radio device, e.g., as indicated by the first message.

In some scenarios, the second message may indicate an alternative set of radio resources. The second message may for example comprise a bitmap a bitmap which indicates the alternative set of radio resources. The bitmap may for example represent a TDM pattern.

In some scenarios, the radio device may receive a third message at optional step 730. The third message may be received as an alternative or in addition to the second message received at step 720. The third message indicates an intention of the further radio device to perform a D2D radio transmission on the set of radio resources. The third message may be received on a control channel. For example, the third message could be received in SCI transmitted on a PSCCH. The third message may be received in a broadcast transmission receivable by the radio device one or more other radio devices. Alternatively, the first message could be received in a unicast message addressed to the radio device. Further, the third message could be received in a multicast message addressed to a group of radio devices including the radio radio device. The third message may indicate the set of radio resources which was detected to be conflicting by the further radio device, e.g., by an SA conveyed in the third message. Further, the third message may indicate a priority of the D2D radio transmission by the further radio device, e.g., in terms of a PPPP. The SCI 405 in FIG. 4 constitutes an example of such third message.

At step 740, the radio device controls the D2D radio transmission by the radio device. This is accomplished based on the ML indicator received with the second message at step 720. Alternatively or in addition, this may be accomplished based on the third message received at step 730. In particular, the radio device may utilize information gained from the second message received at step 720 or information gained from the third message received at step 730 control whether to send the D2D radio transmission on the set of radio resources. For example, if the ML indicator indicates a positive acknowledgement, the radio device may decide to perform the D2D radio transmission on the set of radio resources. If the ML indicator indicates a negative acknowledgement, the radio device may decide to refrain from performing the D2D radio transmission on the set of radio resources. This may involve performing the D2D radio transmission on other radio resources, e.g., on the alternative set of radio resources indicated by the second message. Alternatively, this may involve completely refraining from performing the D2D radio transmission. In response to receiving the third message at step 730, the radio device may control the D2D radio transmission to be not performed on the set of radio resources. In this case, the radio device may control the D2D radio transmission to be performed on other radio resources or the radio device may completely refrain from performing the D2D radio transmission. In some scenarios, the radio device may also control the D2D radio transmission depending on whether the second message was received at step 720. For example, if the second message is absent, the radio device may interpret this as a negative acknowledgement and refrain from performing the D2D radio transmission on the set of radio resources. In other scenarios, the radio device may interpret absence of the second message as a positive acknowledgement and perform the D2D radio transmission on the set of radio resources.

In some scenarios, the first message indicates an intention of the radio device to perform a D2D radio transmission on the set of radio resources in multiple time slots. For example, the first message may also include a reservation or booking of the set of radio resources for one or more future time slots. In such cases, step 720 may involve that the radio device receives a separate feedback message comprising the ML indicator for each of the multiple time slots. In this case, the ML indicator may be determined individually for each of the multiple timeslots. In a similar manner, the alternative set of radio resources may be indicated individually for each of the multiple time slots.

Figure 8:
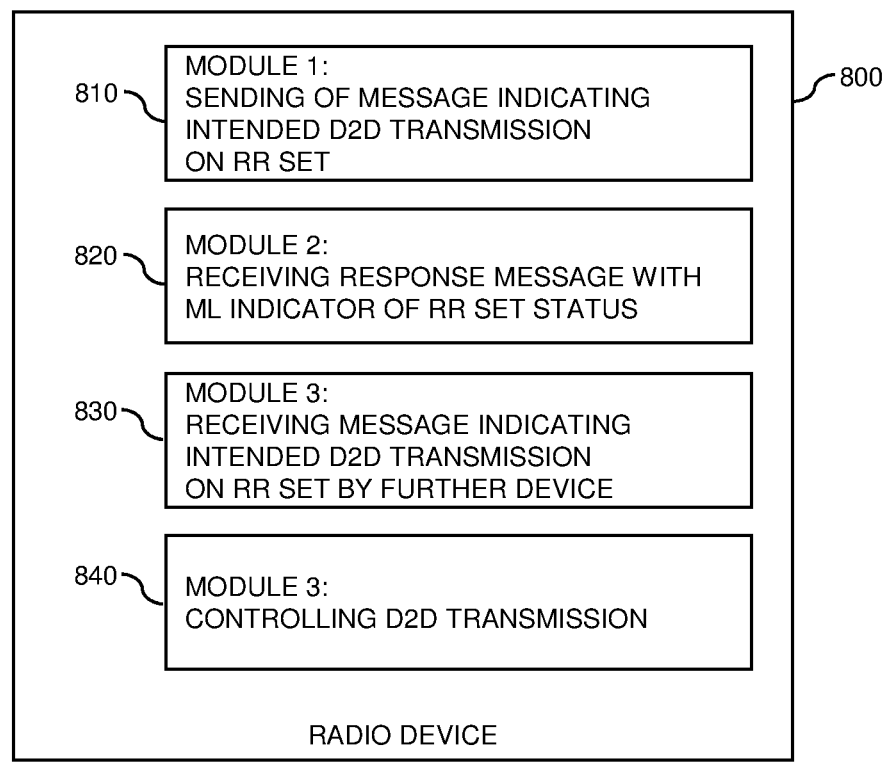
FIG. 8 shows a block diagram for illustrating functionalities of a transmitting radio device according to an embodiment of the invention.

FIG. 8 shows a block diagram for illustrating functionalities of a radio device 800 which operates according to the method of FIG. 7. The radio device 800 may for example correspond to the above-mentioned transmitting radio device or UE 30. As illustrated, the radio device 800 may be provided with a module 810 configured to send a first message indicating an intention of the radio device to perform a D2D radio transmission on a set of radio resources, such as explained in connection with step 710. Further, the radio device 800 may be provided with a module 820 configured to receive a second message comprising an ML indicator of a status of the set of radio resources has determined by the further radio device, such as explained in connection with step 720. Further, the radio device 800 may optionally be provided with a module 830 configured to receive a third message indicating an intention of the further radio device to perform a D2D radio transmission on the set of radio resources, such as explained in connection with step 730. Further, the radio device 800 may be provided with a module 840 configured to control the D2D radio transmission by the radio device, such as explained in connection with step 740.

It is noted that the radio device 800 may include further modules for implementing other functionalities, such as known functionalities of a UE supporting V2X or other types of D2D communication. Further, it is noted that the modules of the radio device 600 do not necessarily represent a hardware structure of the radio device 800, but may also correspond to functional elements, e.g., implemented by hardware, software, or a combination thereof.

Further, it is noted that the method of FIGS. 5 and 7 could also be implemented in a system which comprises a first radio device operating as a transmitting radio device according to the method of FIG. 7, and a second radio device operating as a receiving radio device according to the method of FIG. 5. In such system the first radio device could send a first message to the second radio device, the first message indicating an intention of the first radio device to perform a D2D radio transmission on a set of radio resources. The second radio device could receive the first message from the first radio device and determine the status of the set of radio resources. The second radio device could then send the second message comprising the ML indicator to the first radio device. The first radio device could receive the second message comprising the ML indicator and, depending on the indicator, control the D2D radio transmission by the radio device.

Figure 9:
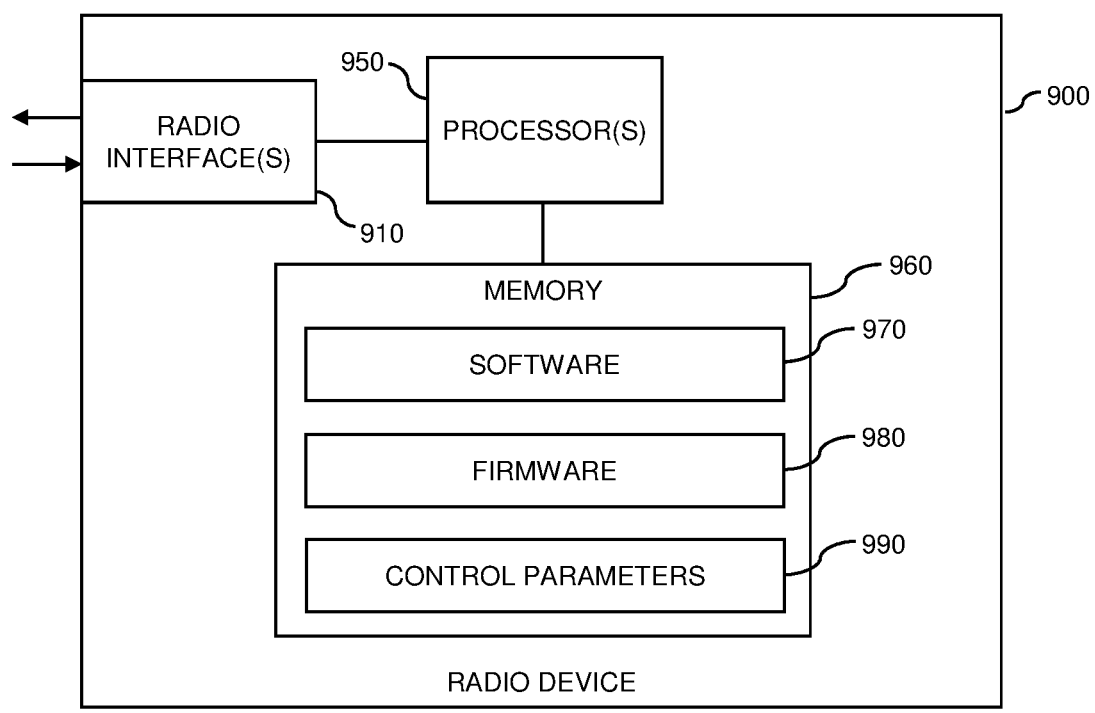
FIG. 9 schematically illustrates structures of a radio device according to an embodiment of the invention.

FIG. 9 illustrates a processor-based implementation of a radio device 900 which may be used for implementing the above described concepts. For example, the structures as illustrated in FIG. 9 may be used for implementing the concepts in the above-mentioned transmitting UE 20 or receiving UE 30.

As illustrated, the radio device 900 includes one or more radio interfaces 910. The radio interface(s) 910 may for example support a wireless access technology supporting D2D radio transmissions, such as the LTE radio technology or NR radio technology. Furthermore, the radio interface(s) 910 may support DL radio transmissions and UL radio transmissions with a wireless communication network.

Further, the radio device 900 may include one or more processors 950 coupled to the radio interface(s) 910 and a memory 960 coupled to the processor(s) 950. By way of example, the radio interface(s) 910, the processor(s) 950, and the memory 960 could be coupled by one or more internal bus systems of the radio device 900. The memory 960 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 960 may include software 970, firmware 980, and/or control parameters 990. The memory 960 may include suitably configured program code to be executed by the processor(s) 950 so as to implement the above-described functionalities of a radio device or apparatus for controlling radio devices, such as explained in connection with FIG. 5 or 7.

It is to be understood that the structures as illustrated in FIG. 9 are merely schematic and that the radio device 900 may actually include further components which, for the sake of clarity, have not been illustrated, e.g., further interfaces or processors. Also, it is to be understood that the memory 960 may include further program code for implementing known functionalities of a UE supporting D2D radio transmissions, e.g., for implementing V2X communication. According to some embodiments, also a computer program may be provided for implementing functionalities of the radio device 900, e.g., in the form of a physical medium storing the program code and/or other data to be stored in the memory 960 or by making the program code available for download or by streaming.

As can be seen, the concepts as described above may be used for controlling D2D radio transmissions in a highly efficient manner. In particular, hidden node problems or exposed node problems may be avoided. Further, a transmitting radio device is enabled to accurately decide whether and in which way to utilize radio resources for performing a D2D radio transmission, by providing accurate information on the assessment of the radio resources by one or more other radio devices, in particular the intended receiver of the D2D radio transmission.

It is to be understood that the examples and embodiments as explained above are merely illustrative and susceptible to various modifications. For example, the illustrated concepts may be applied in connection with various kinds of radio technologies, without limitation to the above-mentioned examples of the LTE radio technology or NR radio technology. Further, it is noted that while the above examples referred to an ML indicator with four levels, other numbers of levels could be used as well, e.g., eight levels or 16 levels. Still further, it is noted that the illustrated concepts could also be extended for coordinating D2D transmissions among any arbitrary number of radio devices. Moreover, it is to be understood that the above concepts may be implemented by using correspondingly designed software to be executed by one or more processors of an existing device or apparatus, or by using dedicated device hardware. Further, it should be noted that the illustrated apparatuses or devices may each be implemented as a single device or as a system of multiple interacting devices or modules.

In view of the above, embodiments provided by the present disclosure include:

Embodiment 1

A method of controlling device-to-device communication in a wireless communication network, the method comprising:

a radio device (30; 900) receiving a first message (202; 302; 402) from a further radio device (20; 900), the first message (202; 302; 402) indicating an intention of the further radio device (20; 900) to perform a device-to-device radio transmission (206; 308; 407) on a set of radio resources;

the radio device (30; 900) determining a status of the set of radio resources; and in response to the first message (202; 302; 402), the radio device (30; 900) sending a second message (204; 305, 306) comprising an indicator which indicates the determined status of the set of radio resources in terms of at least three levels.

Embodiment 2

The method according to embodiment 1, wherein the levels represent different signal levels detected on the set of radio resources.

Embodiment 3

The method according to embodiment 1 or 2, wherein at least one of the levels indicates that the set of radio resources is at least partially occupied.

Embodiment 4

The method according to any one of embodiments 1 to 3, wherein at least one of the levels indicates that the set of radio resources is unoccupied.

Embodiment 5

The method according to any one of embodiments 1 to 4, comprising:

the radio device (30; 900) setting the indicator depending on a capability of the radio device (30; 900).

Embodiment 6

The method according to any one of embodiments 1 to 5, comprising:

the radio device (30; 900) determining the status of the set of radio resources depending on an intention of the radio device (30; 900) to perform a device-to-device radio transmission on the set of radio resources.

Embodiment 7

The method according to embodiment 6, comprising:
the radio device (30; 900) determining the status of the set of radio resources depending on a priority of the device-to-device radio transmission by the radio device (30; 900).

Embodiment 8

The method according to any one of embodiments 1 to 7, comprising:
the radio device (30; 900) determining the status of the set of radio resources depending on a priority of the device-to-device radio transmission by the further radio device (20; 900).

Embodiment 9

The method according to embodiment 8,
wherein the first message (202; 302; 402) indicates the priority of the device-to-device radio transmission by the further radio device (20; 900).

Embodiment 10

The method according to any one of embodiments 1 to 9, wherein the first message (202; 302; 402) indicates the set of radio resources.

Embodiment 11

The method according to any one of embodiments 1 to 10, comprising:
depending on the determined status of the set of radio resources, the radio device (30; 900) determining an alternative set of radio resources,
wherein the second message (204; 305, 306) indicates the alternative set of radio resources.

Embodiment 12

The method according to embodiment 11,
wherein the second message (204; 305, 306) comprises a bitmap which indicates the alternative set of radio resources.

Embodiment 13

The method according to any one of embodiments 1 to 12, comprising:
the radio device (30; 900) receiving a third message (303; 403) from another further radio device (40), the third message (303; 403) indicating an intention of the other further radio device (40) to perform a device-to-device radio transmission on the set of radio resources; and the radio device (30; 900) determining the status of the set of radio resources depending on the third message (303; 403).

Embodiment 14

The method according to embodiment 13, comprising:
the radio device (30; 900) determining the status of the set of radio resources depending on a priority of the device-to-device radio transmission by the other further radio device (40).

Embodiment 15

The method according to embodiment 13 or 14, comprising:
in response to detecting the intention of the further radio device (20; 900) to perform a device-to-device radio transmission on the set of radio resources and the intention of the other further radio device (40) to perform a device-to-device radio transmission on the set of radio resources, the radio device (30; 900) sending a fourth message (405, 406) indicating an intention of the radio device (30; 900) to perform a device-to-device radio transmission on the set of radio resources.

Embodiment 16

The method according to any one of embodiments 1 to 15, comprising:
depending on the determined status of the set of radio resources, the radio device (30; 900) controlling whether to send the second message (204; 305, 306).

Embodiment 17

The method according to any one of embodiments 1 to 16,
wherein the device-to-device radio transmission (206; 308; 407) by the further radio device (20; 900) is a unicast transmission addressed to the radio device (30; 900).

Embodiment 18

The method according to any one of embodiments 1 to 17, comprising:
the radio device (30; 900) sending the second message (204; 305) in a unicast transmission addressed to the further radio device (20; 900).

Embodiment 19

The method according to any one of embodiments 1 to 17, comprising:
the radio device (30; 900) sending the second message (204; 305, 306) in a broadcast transmission receivable by the further radio device (20; 900) and one or more other radio devices (40).

Embodiment 20

The method according to any one of embodiments 1 to 19,
wherein the first message (202; 302; 402) indicates an intention of the further radio device (20; 900) to perform a device-to-device radio transmission on the set of radio resources in multiple time slots.

Embodiment 21

The method according to embodiment 20, comprising:
the radio device (30; 900) determining a status of the set of radio resources individually for each of the time slots; and
for each of the time slots, the radio device (30; 900) sending the second message (204; 305, 306) comprising the indicator which indicates the determined status of the set of radio resources for the time slot.

Embodiment 22

A method of controlling device-to-device communication in a wireless communication network, the method comprising:
a radio device (20; 900) sending a first message (202; 302; 402) to a further radio device (30; 900), the first message (202; 302; 402) indicating an intention of the radio device (20; 900) to perform a device-to-device radio transmission (206; 308; 407) on a set of radio resources;

in response to the first message (202; 302; 402), the radio device (20; 900) receiving a second message (204; 305) comprising an indicator which indicates a status of the set of radio resources as determined by the further radio device (30; 900) in terms of at least three levels; and depending on the indicator, the radio device (20; 900) controlling the device-to-device radio transmission (206; 308; 407) by the radio device (20; 900).

Embodiment 23

The method according to embodiment 22,
wherein the levels represent different signal levels detected on the set of radio resources.

Embodiment 24

The method according to embodiment 22 or 23,
wherein at least one of the levels indicates that the set of radio resources is at least partly occupied.

Embodiment 25

The method according to any one of embodiments 22 to 24,
wherein at least one of the levels indicates that the set of radio resources is unoccupied.

Embodiment 26

The method according to any one of embodiments 22 to 25,
wherein the indicator depends on a capability of the further radio device (30; 900).

Embodiment 27

The method according to any one of embodiments 22 to 26,
wherein the indicator depends on an intention of the radio device (30; 900) to perform a device-to-device radio transmission on the set of radio resources.

Embodiment 28

The method according to embodiment 27,
wherein the indicator depends on a priority of the device-to-device radio transmission by the radio device (20; 900).

Embodiment 29

The method according to any one of embodiments 22 to 28,
wherein the indicator depends on a priority of the device-to-device radio transmission by the further radio device (30; 900).

Embodiment 30

The method according to any one of embodiments 22 to 29,
wherein the first message (202; 302; 402) indicates a priority of the device-to-device radio transmission by the radio device (20; 900).

Embodiment 31

The method according to any one of embodiments 22 to 30,
wherein the first message (202; 302; 402) indicates the set of radio resources.

Embodiment 32

The method according to any one of embodiments 22 to 31,
wherein the second message (204; 305) indicates an alternative set of radio resources, and
wherein said controlling of the device-to-device radio transmission by the radio device (20; 900) comprises controlling the device-to-device radio transmission by the radio device (20; 900) to be performed on the alternative set of radio resources.

Embodiment 33

The method according to embodiment 32,
wherein the second message (204; 305) comprises a bitmap which indicates the alternative set of radio resources.

Embodiment 34

The method according to any one of embodiments 22 to 33, comprising:
the radio device (20; 900) receiving a third message (405) indicating an intention of the further radio device (30; 900) to perform a device-to-device radio transmission on the set of radio resources, and
in response to the third message (405), the radio device (20; 900) controlling the device-to-device radio transmission by the radio device (20; 900) not to be performed on the set of radio resources.

Embodiment 35

The method according to any one of embodiments 22 to 34, comprising:
in response to not receiving the second message (204; 305), the radio device (20; 900) controlling the device-to-device radio transmission by the radio device (20; 900) not to be performed on the set of radio resources.

Embodiment 36

The method according to any one of the embodiments 22 to 35,
wherein the device-to-device radio transmission by the radio device (20; 900) is a unicast transmission addressed to the further radio device (30; 900).

Embodiment 37

The method according to any one of embodiments 22 to 36, comprising:
the radio device (20; 900) receiving the second message (204; 305) in a unicast transmission addressed to the radio device (20; 900).

Embodiment 38

The method according to any one of embodiments 22 to 36, comprising:

the radio device (20; 900) receiving the second message (204; 305) in a broadcast transmission receivable by the radio device (20; 900) and one or more other radio devices (40).

Embodiment 39

The method according to any one of embodiments 22 to 38,
wherein the set of radio resources comprises radio resources in a multiple time slots.

Embodiment 40

The method according to embodiment 39, comprising:
for each of the time slots, the radio device (30; 900) receiving the second message (204; 305) comprising the indicator which indicates the determined status of the set of radio resources individually for the time slot.

Embodiment 41

A radio device (30; 900) for a wireless communication network, the radio device (30; 900) being configured to:
receive a first message (202; 302; 402) from a further radio device (20; 900), the first message (202; 302; 402) indicating an intention of the further radio device (20; 900) to perform a device-to-device radio transmission (206; 308; 407) on a set of radio resources;
determine a status of the set of radio resources; and
in response to the first message (202; 302; 402), send a second message (204; 305, 306) comprising an indicator which indicates the determined status of the set of radio resources in terms of at least three levels.

Embodiment 42

The radio device (30; 900) according to embodiment 41,
wherein the radio device (30; 900) is configured to perform the steps of a method according to any one of embodiments 2 to 21.

Embodiment 43

The radio device (30; 900) according to embodiment 41 or 42, comprising:
at least one processor (950) and a memory (960) containing instructions executable by said at least one processor (950), whereby the radio device (30; 900) is operative to perform a method according to any one of embodiments 1 to 21.

Embodiment 44

The radio device (30; 900) according to any one of embodiments 41 to 43,
wherein the levels represent different signal levels detected on the set of radio resources.

Embodiment 45

The radio device (30; 900) according to any one of embodiments 41 to 44,
wherein at least one of the levels indicates that the set of radio resources is at least partially occupied.

Embodiment 46

The radio device (30; 900) according to any one of embodiments 41 to 45,
wherein at least one of the levels indicates that the set of radio resources is unoccupied.

Embodiment 47

The radio device (30; 900) according to any one of embodiments 41 to 46,
wherein the radio device (30; 900) is configured to set the indicator depending on a capability of the radio device (30; 900).

Embodiment 48

The radio device (30; 900) according to any one of embodiments 41 to 47,
wherein the radio device (30; 900) is configured to determine the status of the set of radio resources depending on an intention of the radio device (30; 900) to perform a device-to-device radio transmission on the set of radio resources.

Embodiment 49

The radio device (30; 900) according to embodiment 48,
wherein the radio device (30; 900) is configured to determine the status of the set of radio resources depending on a priority of the device-to-device radio transmission by the radio device (30; 900).

Embodiment 50

The radio device (30; 900) according to any one of embodiments 41 to 49,
wherein the radio device (30; 900) is configured to determine the status of the set of radio resources depending on a priority of the device-to-device radio transmission by the further radio device (20; 900).

Embodiment 51

The radio device (30; 900) according to embodiment 50,
wherein the first message (202; 302; 402) indicates the priority of the device-to-device radio transmission by the further radio device (20; 900).

Embodiment 52

The radio device (30; 900) according to any one of embodiments 41 to 53,
wherein the first message (202; 302; 402) indicates the set of radio resources.

Embodiment 53

The radio device (30; 900) according to any one of embodiments 41 to 52,
wherein the radio device (30; 900) is configured to:
depending on the determined status of the set of radio resources, determine an alternative set of radio resources,
wherein the second message (204; 305, 306) indicates the alternative set of radio resources.

Embodiment 54

The radio device (30; 900) according to embodiment 53, wherein the second message (204; 305, 306) comprises a bitmap which indicates the alternative set of radio resources.

Embodiment 55

The method according to any one of embodiments 41 to 54,
wherein the radio device (30; 900) is configured to:
receive a third message (303; 403) from another further radio device (40), the third message (303; 403) indicating an intention of the other further radio device (40) to perform a device-to-device radio transmission on the set of radio resources; and
determine the status of the set of radio resources depending on the third message (303; 403).

Embodiment 56

The radio device (30; 900) according to embodiment 55, wherein the radio device (30; 900) is configured to determine the status of the set of radio resources depending on a priority of the device-to-device radio transmission by the other further radio device (40).

Embodiment 57

The radio device (30; 900) according to embodiment 55 or 56,
wherein the radio device (30; 900) is configured to:
in response to detecting the intention of the further radio device (20; 900) to perform a device-to-device radio transmission on the set of radio resources and the intention of the other further radio device (40) to perform a device-to-device radio transmission on the set of radio resources, send a fourth message (405, 406) indicating an intention of the radio device (30; 900) to perform a device-to-device radio transmission on the set of radio resources.

Embodiment 58

The radio device (30; 900) according to any one of embodiments 41 to 57,
wherein the radio device (30; 900) is configured to, depending on the determined status of the set of radio resources, control whether to send the second message (204; 305, 306).

Embodiment 59

The radio device (30; 900) according to any one of embodiments 41 to 58,
wherein the device-to-device radio transmission (206; 308; 407) by the further radio device (20; 900) is a unicast transmission addressed to the radio device (30; 900).

Embodiment 60

The radio device (30; 900) according to any one of embodiments 41 to 59,
wherein the radio device (30; 900) is configured to send the second message (204; 305) in a unicast transmission addressed to the further radio device (20; 900).

Embodiment 61

The radio device (30; 900) according to any one of embodiments 41 to 59,
wherein the radio device (30; 900) is configured to send the second message (204; 305, 306) in a broadcast transmission receivable by the further radio device (20; 900) and one or more other radio devices (40).

Embodiment 62

The radio device (30; 900) according to any one of embodiments 41 to 61,
wherein the first message (202; 302; 402) indicates an intention of the further radio device (20; 900) to perform a device-to-device radio transmission on the set of radio resources in multiple time slots.

Embodiment 63

The radio device (30; 900) according to embodiment 62, wherein the radio device (30; 900) is configured to:
determine a status of the set of radio resources individually for each of the time slots; and
for each of the time slots, send the second message (204; 305, 306) comprising the indicator which indicates the determined status of the set of radio resources for the time slot.

Embodiment 64

A radio device (20; 900) for a wireless communication network, the radio device (20; 900) being configured to:
send a first message (202; 302; 402) to a further radio device (30; 900), the first message (202; 302; 402) indicating an intention of the radio device (20; 900) to perform a device-to-device radio transmission (206; 308; 407) on a set of radio resources;
in response to the first message (202; 302; 402), receive a second message (204; 305) comprising an indicator which indicates a status of the set of radio resources as determined by the further radio device (30; 900) in terms of at least three levels; and
depending on the indicator, control the device-to-device radio transmission (206; 308; 407) by the radio device (20; 900).

Embodiment 65

The radio device (20; 900) according to embodiment 64, wherein the radio device (20; 900) is configured to perform the steps of a method according to any one of embodiments 23 to 40.

Embodiment 66

The radio device (20; 900) according to embodiment 64 or 65, comprising:
at least one processor (950) and a memory (960) containing instructions executable by said at least one processor (950), whereby the radio device (30; 900) is operative to perform a method according to any one of embodiments 22 to 40.

Embodiment 67

The radio device (20; 900) according to any one of embodiments 64 to 66,
wherein the levels represent different signal levels detected on the set of radio resources.

Embodiment 68

The radio device (20; 900) according to any one of embodiment 64 to 67,
wherein at least one of the levels indicates that the set of radio resources is at least partly occupied.

Embodiment 69

The radio device (20; 900) according to any one of embodiments 64 to 68,
wherein at least one of the levels indicates that the set of radio resources is unoccupied.

Embodiment 70

The radio device (20; 900) according to any one of embodiments 64 to 69,
wherein the indicator depends on a capability of the further radio device (30; 900).

Embodiment 71

The radio device (20; 900) according to any one of embodiments 64 to 70,
wherein the indicator depends on an intention of the radio device (30; 900) to perform a device-to-device radio transmission on the set of radio resources.

Embodiment 72

The radio device (20; 900) according to embodiment 71,
wherein the indicator depends on a priority of the device-to-device radio transmission by the radio device (20; 900).

Embodiment 73

The radio device (20; 900) according to any one of embodiments 64 to 72,
wherein the indicator depends on a priority of the device-to-device radio transmission by the further radio device (30; 900).

Embodiment 74

The radio device (20; 900) according to any one of embodiments 64 to 73,
wherein the first message (202; 302; 402) indicates a priority of the device-to-device radio transmission by the radio device (20; 900).

Embodiment 75

The radio device (20; 900) according to any one of embodiments 64 to 74,
wherein the first message (202; 302; 402) indicates the set of radio resources.

Embodiment 76

The radio device (20; 900) according to any one of embodiments 64 to 75,
wherein the second message (204; 305) indicates an alternative set of radio resources, and
wherein the radio device (20; 900) is configured to control the device-to-device radio transmission by the radio device (20; 900) by controlling the device-to-device radio transmission by the radio device (20; 900) to be performed on the alternative set of radio resources.

Embodiment 77

The radio device (20; 900) according to embodiment 76,
wherein the second message (204; 305) comprises a bitmap which indicates the alternative set of radio resources.

Embodiment 78

The radio device (20; 900) according to any one of embodiments 64 to 77,
wherein the radio device (20; 900) is configured to:
receive a third message (405) indicating an intention of the further radio device (30; 900) to perform a device-to-device radio transmission on the set of radio resources, and
in response to the third message (405), control the device-to-device radio transmission by the radio device (20; 900) not to be performed on the set of radio resources.

Embodiment 79

The radio device (20; 900) according to any one of embodiments 64 to 78,
wherein the radio device (20; 900) is configured to, in response to not receiving the second message (204; 305), control the device-to-device radio transmission by the radio device (20; 900) not to be performed on the set of radio resources.

Embodiment 80

The radio device (20; 900) according to any one of the embodiments 64 to 79,
wherein the device-to-device radio transmission by the radio device (20; 900) is a unicast transmission addressed to the further radio device (30; 900).

Embodiment 81

The radio device (20; 900) according to any one of embodiments 64 to 80,
wherein the radio device (20; 900) is configured to receive the second message (204; 305) in a unicast transmission addressed to the radio device (20; 900).

Embodiment 82

The radio device (20; 900) according to any one of embodiments 64 to 80,
wherein the radio device (20; 900) is configured to receiving the second message (204; 305) in a broadcast transmission receivable by the radio device (20; 900) and one or more other radio devices (40).

Embodiment 83

The radio device (20; 900) according to any one of embodiments 64 to 82,
wherein the set of radio resources comprises radio resources in multiple time slots.

Embodiment 84

The radio device (20; 900) according to embodiment 83,
wherein the radio device (20; 900) is configured to, for each of the time slots, receive the second message (204; 305) comprising the indicator which indicates the determined status of the set of radio resources individually for the time slot.

Embodiment 85

A system, comprising:
a first radio device (20; 900) and a second radio device (30; 900),
the first radio device (20; 900) being configured to:
send a first message (202; 302; 402) to the radio device (20; 900), the first message (202; 302; 402) indicating an intention of the first radio device (20; 900) to perform a device-to-device radio transmission (206; 308; 407) on a set of radio resources;
in response to the first message (202; 302; 402), receive a second message (204; 305) comprising an indicator which indicates a status of the set of radio resources as determined by the second radio device (30; 900) in terms of at least three levels; and
depending on the indicator, control the device-to-device radio transmission (206; 308; 407) by the radio device (20; 900),
the second radio device (30; 900) being configured to:
receive the first message (202; 302; 402) from the first radio device (20; 900);
determine the status of the set of radio resources; and
in response to the first message (202; 302; 402), send the second message (204; 305) comprising the indicator which indicates the determined status of the set of radio resources.

Embodiment 86

A computer program comprising program code to be executed by at least one processor of a radio device (20, 30), whereby execution of the program code causes the radio device (30, 20) to perform a method according to any one of embodiments 1 to 40.

Embodiment 87

A computer program product comprising program code to be executed by at least one processor of a radio device (20, 30), whereby execution of the program code causes the radio device (20, 30) to perform a method according to any one of embodiments 1 to 40.

The invention claimed is:

1. A method of controlling device-to-device communication in a wireless communication network, the method comprising:
a radio device receiving a first message from a further radio device, the first message indicating an intention of the further radio device to perform a device-to-device, D2D, radio transmission on a set of radio resources;
the radio device determining a status of the set of radio resources; and
in response to the first message, the radio device sending a second message comprising an indicator which indicates the determined status of the set of radio resources in terms of at least three levels, wherein the at least three levels comprises at least three levels of received signal strength of a measured signal on the set of radio resources and the indicator is based on a capability of the radio device to successfully receive and decode an intended device-to-device radio transmission based on the interfering signal strength on the set of radios resources or the congestion level on the set of radio resources,
wherein a first level of the at least three levels indicates a positive acknowledgement that the radio device approves the D2D radio transmission on the set of radio resources and another level of the at least three levels indicates a negative acknowledgment that the radio device disapproves the D2D radio transmission on the set of radio resources.

2. The method according to claim 1, wherein the at least three levels represent different signal levels detected on the set of radio resources, wherein at least one of the levels indicates that the set of radio resources is at least partially occupied, and/or wherein at least one of the levels indicates that the set of radio resources is unoccupied.

3. The method according to claim 1, comprising:
the radio device determining the status of the set of radio resources depending on one or more of an intention of the radio device to perform a device-to-device radio transmission on the set of radio resources, a priority of the device-to-device radio transmission by the radio device, and/or a priority of the device-to-device radio transmission by the further radio device.

4. The method according to claim 1, comprising:
depending on the determined status of the set of radio resources, the radio device determining an alternative set of radio resources to be used for the device-to-device radio transmission,
wherein the second message indicates the alternative set of radio resources.

5. The method according to claim 1, comprising:
the radio device receiving a third message from another further radio device, the third message indicating an intention of the other further radio device to perform a device-to-device radio transmission on the set of radio resources; and
the radio device determining the status of the set of radio resources depending on the third message.

6. The method according to claim 5, comprising:
in response to detecting the intention of the further radio device to perform a device-to-device radio transmission on the set of radio resources and the intention of the other further radio device to perform a device-to-device radio transmission on the set of radio resources, the radio device sending a fourth message indicating an intention of the radio device to perform a device-to-device radio transmission on the set of radio resources.

7. A computer program product comprising a non-transitory storage medium including program code to be executed by at least one processor of a radio device, whereby execution of the program code causes the radio device to perform a method according to claim 1.

8. A method of controlling device-to-device communication in a wireless communication network, the method comprising:
- a radio device sending a first message to a further radio device, the first message indicating an intention of the radio device to perform a device-to-device, D2D, radio transmission on a set of radio resources;
- in response to the first message, the radio device receiving a second message comprising an indicator which indicates a status of the set of radio resources as determined by the further radio device in terms of at least three levels, wherein the at least three levels comprises at least three levels of received signal strength of a measured signal on the set of radio resources and the indicator is based on a capability of the further radio device to successfully receive and decode an intended D2D radio transmission based on the interfering signal strength on the set of radios resources or the congestion level on the set of radio resources, wherein a first level of the at least three levels indicates a positive acknowledgement that the further radio device approves the D2D radio transmission on the set of radio resources and another level of the at least three levels indicates a negative acknowledgment that the further radio device disapproves the D2D radio transmission on the set of radio resources; and
- depending on the indicator, the radio device controlling the D2D radio transmission by the radio device.

9. The method according to claim 8, wherein the at least three levels represent different signal levels detected on the set of radio resources, wherein at least one of the levels indicates that the set of radio resources is at least partly occupied, and/or wherein at least one of the levels indicates that the set of radio resources is unoccupied.

10. The method according to claim 8, wherein the indicator depends on one or more of an intention of the radio device to perform a device-to-device radio transmission on the set of radio resources, a priority of the device-to-device radio transmission by the radio device, and/or a priority of the device-to-device radio transmission by the further radio device.

11. The method according to claim 8,
- wherein the second message indicates an alternative set of radio resources to be used for the device-to-device radio transmission, and
- wherein said controlling of the device-to-device radio transmission by the radio device comprises controlling the device-to-device radio transmission by the radio device to be performed on the alternative set of radio resources.

12. A radio device for a wireless communication network, the radio device comprising:
- a processor; and
- memory coupled with the processor, said memory containing instructions executable by said processor whereby said radio device is operative to:
  - receive a first message from a further radio device, the first message indicating an intention of the further radio device to perform a device-to-device, D2D, radio transmission on a set of radio resources;
  - determine a status of the set of radio resources; and
  - in response to the first message, send a second message comprising an indicator which indicates the determined status of the set of radio resources in terms of at least three levels, wherein the at least three levels comprises at least three levels of received signal strength of a measured signal on the set of radio resources and the indicator is based on a capability of the radio device to successfully receive and decode an intended D2D radio transmission based on the interfering signal strength on the set of radios resources or the congestion level on the set of radio resources,
  - wherein a first level of the at least three levels indicates a positive acknowledgement that the radio device approves the D2D radio transmission on the set of radio resources and another level of the at least three levels indicates a negative acknowledgment that the radio device disapproves the D2D radio transmission on the set of radio resources.

13. A computer program product comprising a non-transitory storage medium including program code to be executed by at least one processor of a radio device, whereby execution of the program code causes the radio device to perform a method according to claim 8.

14. The radio device according to claim 12, wherein the at least three levels represent different signal levels detected on the set of radio resources, wherein at least one of the levels indicates that the set of radio resources is at least partially occupied, and/or wherein at least one of the levels indicates that the set of radio resources is unoccupied.

15. The radio device according to claim 12, whereby said radio device is further operative to:
- determine the status of the set of radio resources depending on one or more of an intention of the radio device to perform a device-to-device radio transmission on the set of radio resources, a priority of the device-to-device radio transmission by the radio device, and/or a priority of the device-to-device radio transmission by the further radio device.

16. The radio device according to claim 12, whereby said radio device is further operative to:
- determine, depending on the determined status of the set of radio resources, an alternative set of radio resources to be used for the device-to-device radio transmission, wherein the second message indicates the alternative set of radio resources.

17. The radio device according to claim 12, whereby said radio device is further operative to:
- receive a third message from another further radio device, the third message indicating an intention of the other further radio device to perform a device-to-device radio transmission on the set of radio resources; and
- determine the status of the set of radio resources depending on the third message.

18. The radio device according to claim 17, whereby said radio device is further operative to:
- send, in response to detecting the intention of the further radio device to perform a device-to-device radio transmission on the set of radio resources and the intention of the other further radio device to perform a device-to-device radio transmission on the set of radio resources, a fourth message indicating an intention of the radio device to perform a device-to-device radio transmission on the set of radio resources.

19. A radio device for a wireless communication network, the radio device comprising:
- a processor; and
- memory coupled with the processor, said memory containing instructions executable by said processor whereby said radio device is operative to:
  - send a first message to a further radio device, the first message indicating an intention of the radio device to perform a device-to-device, D2D radio transmission on a set of radio resources;

in response to the first message, receive a second message comprising an indicator which indicates a status of the set of radio resources as determined by the further radio device in terms of at least three levels, wherein the at least three levels comprises at least three levels of received signal strength of a measured signal on the set of radio resources and the indicator is based on a capability of the further radio device to successfully receive and decode an intended D2D radio transmission based on the interfering signal strength on the set of radios resources or the congestion level on the set of radio resources, wherein a first level of the at least three levels indicates a positive acknowledgement that the further radio device approves the D2D radio transmission on the set of radio resources and another level of the at least three levels indicates a negative acknowledgment that the further radio device disapproves the D2D radio transmission on the set of radio resources; and depending on the indicator, control the D2D radio transmission by the radio device.

20. The radio device according to claim 19, wherein the levels represent different signal levels detected on the set of radio resources, wherein at least one of the levels indicates that the set of radio resources is at least partly occupied, and/or wherein at least one of the levels indicates that the set of radio resources is unoccupied.

21. The radio device according to claim 19, wherein the indicator depends on one or more of an intention of the radio device to perform a device-to-device radio transmission on the set of radio resources, a priority of the device-to-device radio transmission by the radio device, and/or a priority of the device-to-device radio transmission by the further radio device.

22. The radio device according to claim 19,
wherein the second message indicates an alternative set of radio resources to be used for the device-to-device radio transmission, and
wherein said controlling of the device-to-device radio transmission by the radio device comprises controlling the device-to-device radio transmission by the radio device to be performed on the alternative set of radio resources.

\* \* \* \* \*